United States Patent [19]
Smith et al.

[11] Patent Number: 5,890,545
[45] Date of Patent: Apr. 6, 1999

[54] ELECTRIC DRIVE BUNKER RAKE

[75] Inventors: Donald H. Smith, Malvern, Pa.; Larry A. Johnson, Humboldt, Kans.

[73] Assignee: Smithco, Inc., Wayne, Pa.

[21] Appl. No.: 847,051

[22] Filed: May 1, 1997

Related U.S. Application Data

[60] Provisional application No. 60/017,216, May 6, 1996.

[51] Int. Cl.[6] .................................................. A01B 5/00
[52] U.S. Cl. ..................... 172/200; 172/620; 172/784; 172/684.5; 180/65.1; 180/216; 74/560
[58] Field of Search ..................................... 172/192, 781, 172/784, 197, 620, 145, 200, 199, 684.5; 318/371, 376; 74/512, 560, 562.5; 180/65.1, 216, 65.6, 20

[56] References Cited

U.S. PATENT DOCUMENTS

| | | | |
|---|---|---|---|
| D. 355,148 | 2/1995 | Orsolini | D12/85 |
| 657,650 | 9/1900 | Dyer | 180/58 |
| 3,331,479 | 7/1967 | Pascual | 74/560 |
| 3,613,802 | 10/1971 | Carlson et al. | 172/620 X |
| 3,649,896 | 3/1972 | Mason et al. | 318/387 |
| 3,739,860 | 6/1973 | Rogers | 172/620 X |
| 3,818,293 | 6/1974 | Wood et al. | 318/139 |
| 3,823,781 | 7/1974 | Chech et al. | 172/192 |
| 4,113,045 | 9/1978 | Downing, Jr. | 180/65 C |
| 4,124,812 | 11/1978 | Naito et al. | 319/371 |
| 4,196,785 | 4/1980 | Downing, Jr. | 180/6.28 |
| 4,278,143 | 7/1981 | Nagai | 74/560 X |
| 4,315,217 | 2/1982 | Sharber | 324/434 |
| 4,347,907 | 9/1982 | Downing, Jr. | 180/65 C |
| 4,383,213 | 5/1983 | Tyrner | 318/158 X |
| 4,573,549 | 3/1986 | Pankow | 180/216 |
| 4,662,472 | 5/1987 | Christianson et al. | 180/235 |
| 5,088,855 | 2/1992 | Giliberti | 180/20 X |
| 5,180,275 | 1/1993 | Czech et al. | 414/541 |
| 5,406,778 | 4/1995 | Lamb et al. | . |
| 5,562,397 | 10/1996 | Albright | 37/468 X |
| 5,699,863 | 12/1997 | Figura | 172/145 |
| 5,725,068 | 3/1998 | Smith, Jr. et al. | 180/307 |
| 5,743,347 | 4/1998 | Gingerich | 180/65.1 |

OTHER PUBLICATIONS

Gehl Skid Loaders Brochure p. 4, Jun. 1995.
Clark Differentials Theory of Operation, 9035, pp. 1–5, Feb. 1987.

*Primary Examiner*—Thomas B. Will
*Assistant Examiner*—Victor Batson
*Attorney, Agent, or Firm*—Skinner and Associates

[57] ABSTRACT

An all electric riding bunker rake primarily suited for maintaining sand traps, or bunkers on a golf course. It is embodied as a tricycle-style vehicle having a frame supported on three wheels, an electrically actuated rake lifting mechanism at the rear of the vehicle supported by the frame, and a removable rake attachment connected to the rake lifting mechanism. The rake is dragged on the sand behind the vehicle to smooth the sand in a bunker. An electric motor drives the rear wheels through a gear box, and a regenerative type braking system works in conjunction with the electric motor to slow the vehicle whenever it exceeds eleven miles per hour when driven, or two miles an hour when unattended. The frame supports an onboard electrical battery power source and a hood to which a seat is attached on which the operator sits to control the operation of the vehicle and the rake lifting and lowering function. The rear wheels have drum brakes actuated by a foot pedal which has a parking brake linkage integral with it. An electrically raised and lowered cultivator is also attached to the vehicle between the front and rear wheels to aid in breaking lumps of sand before the rake smoothes the sand.

32 Claims, 16 Drawing Sheets

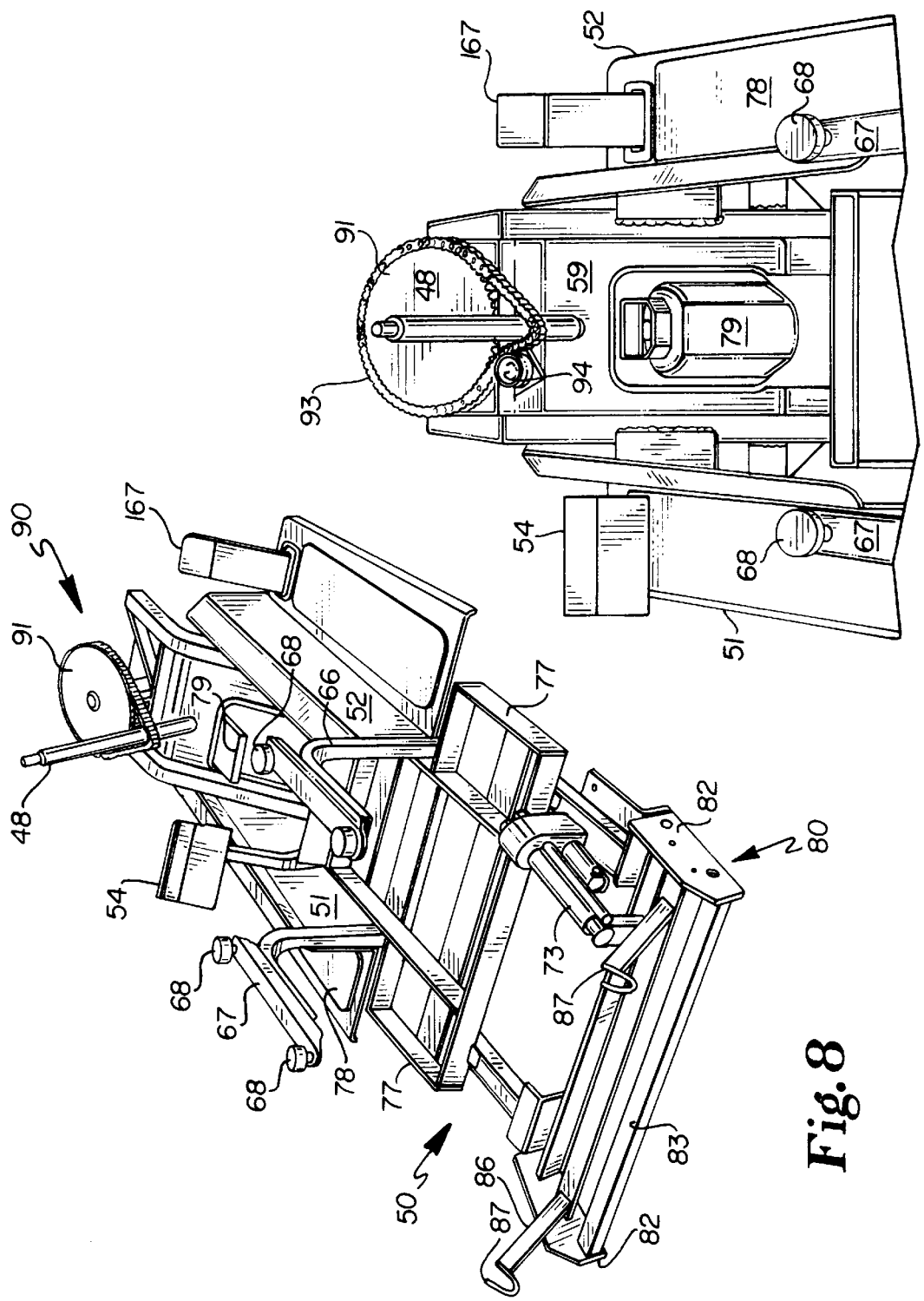

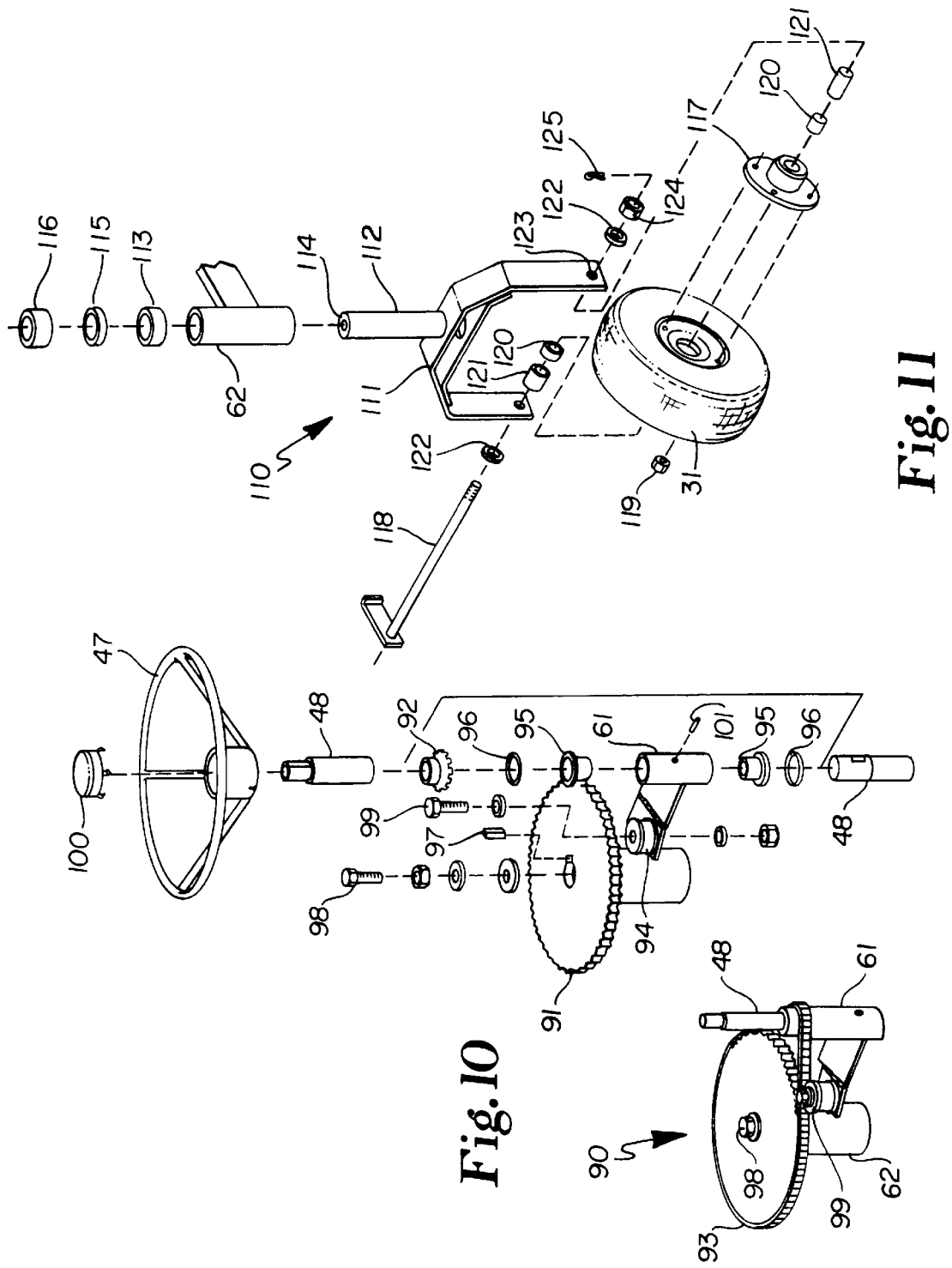

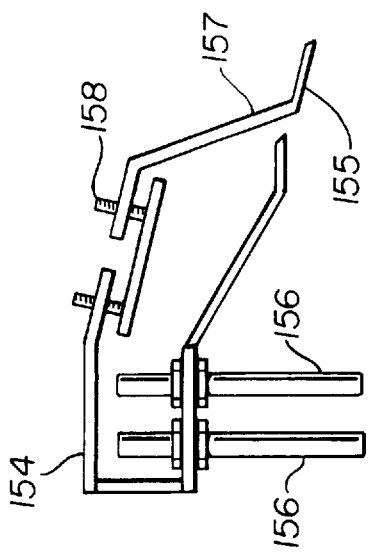
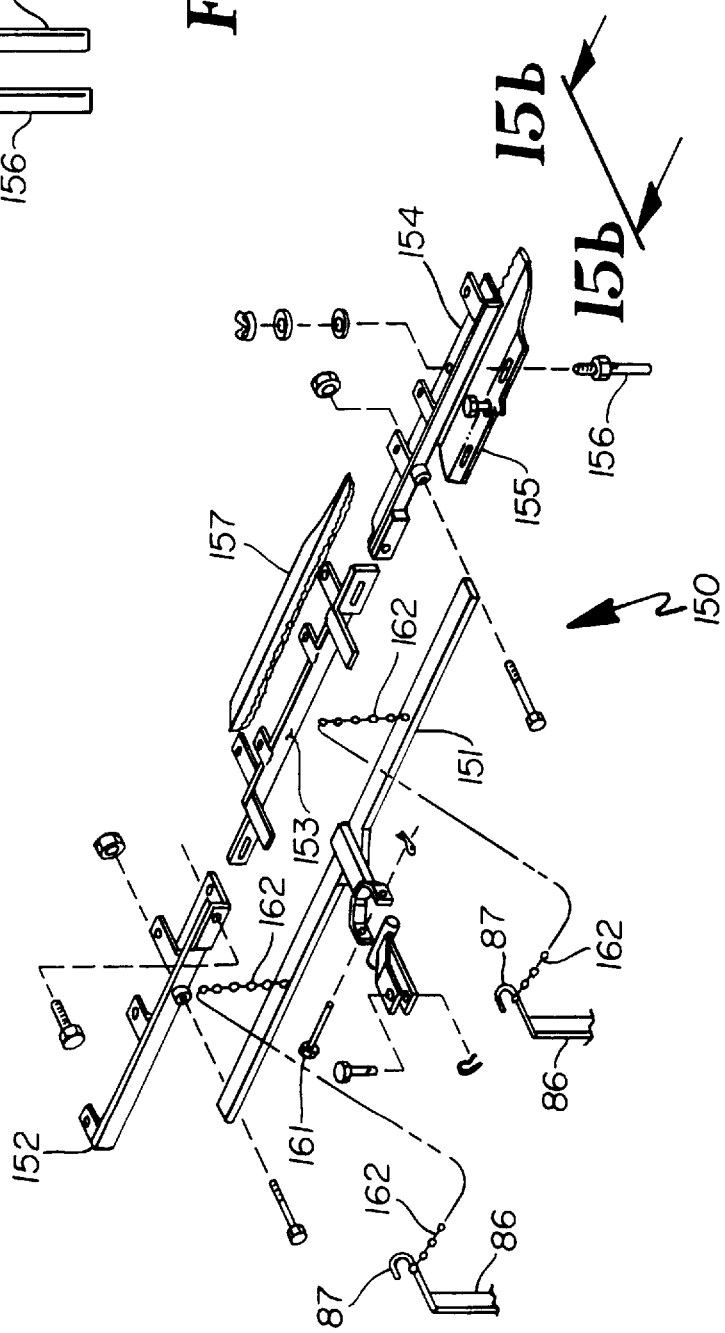
Fig.15b
Fig.15a

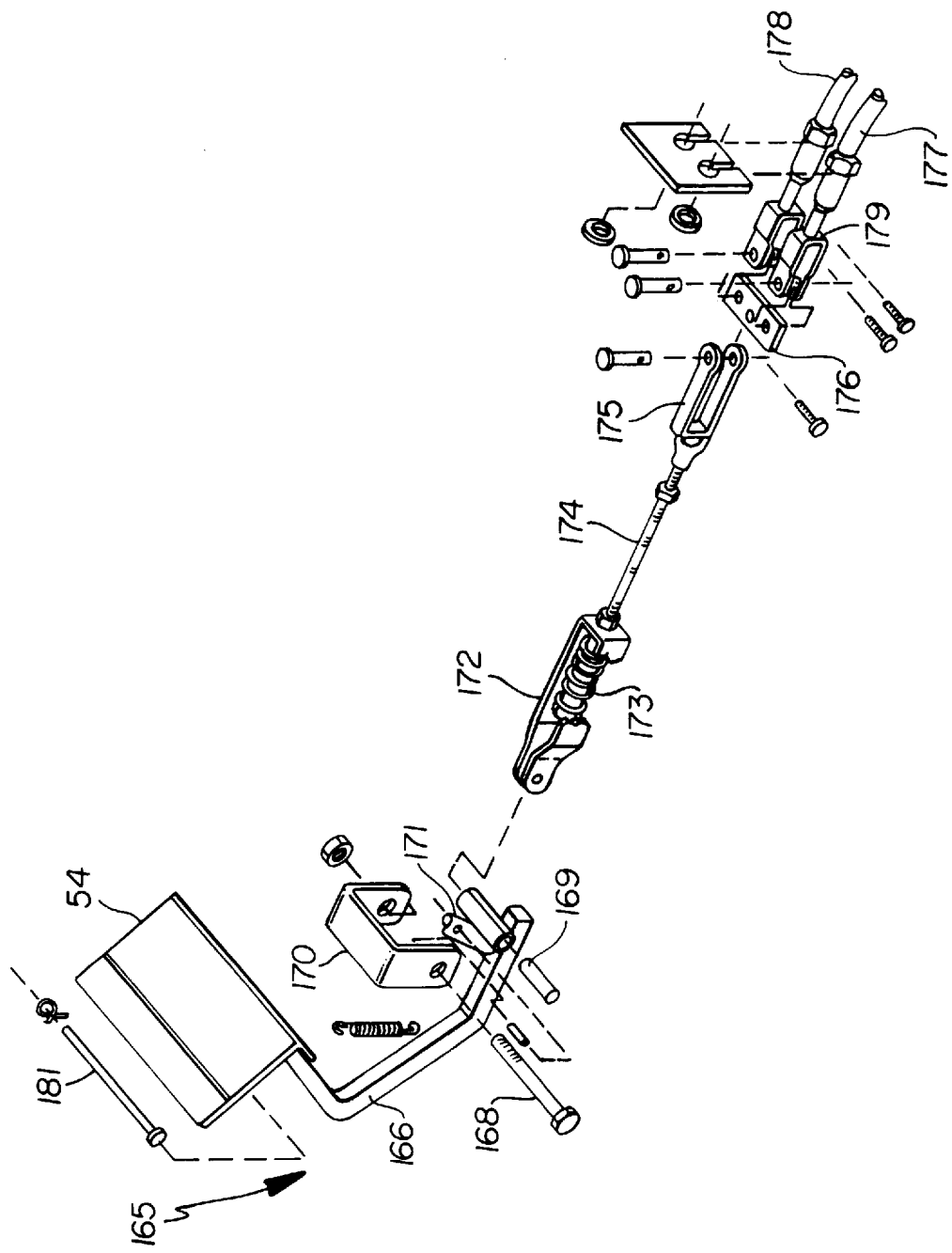

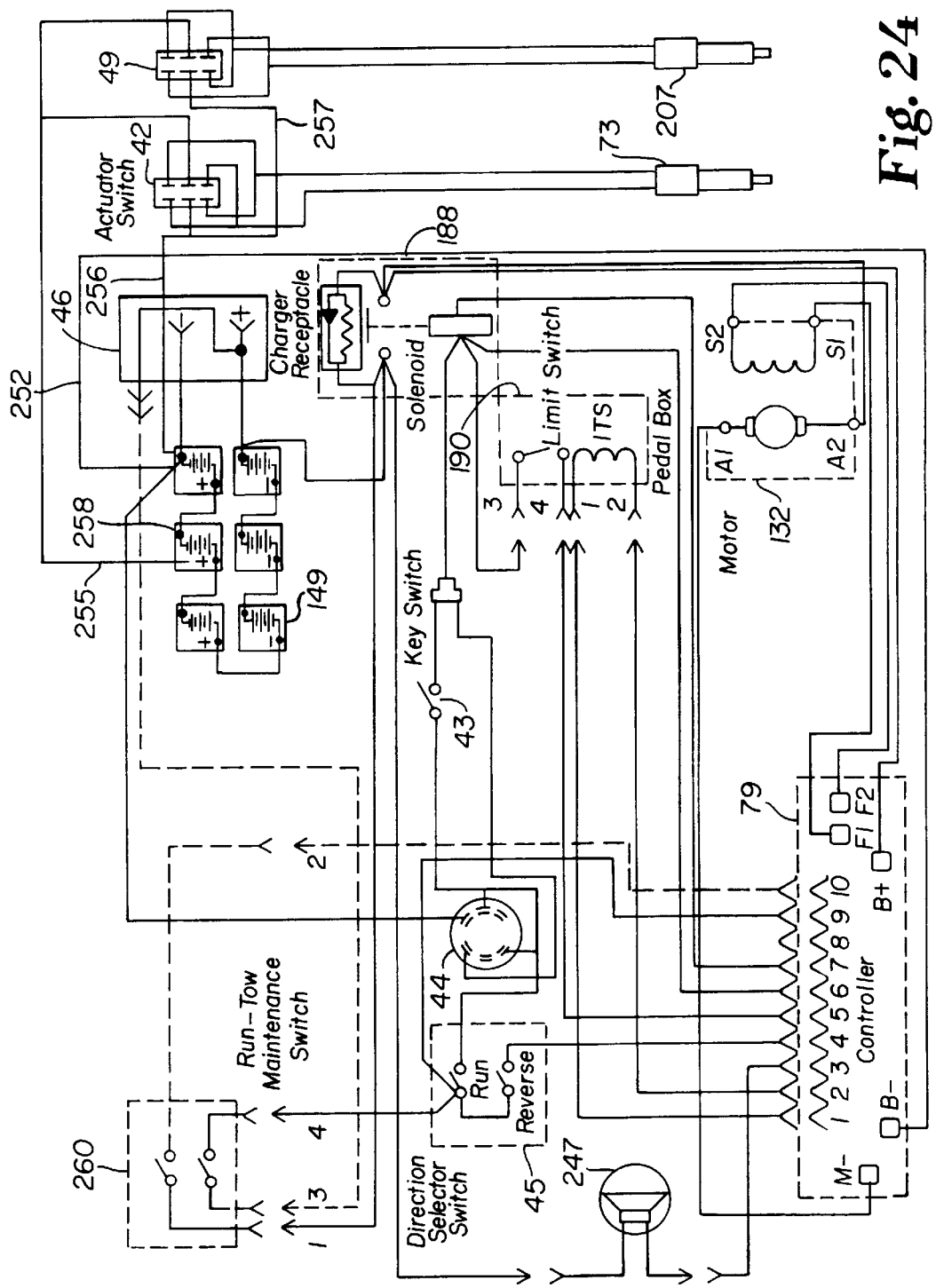

ELECTRIC DRIVE BUNKER RAKE

CROSS-REFERENCE TO RELATED APPLICATIONS, IF ANY

This application claims the benefit, under 35 U.S.C. 119(e), of U.S. provisional application Ser. No. 60/017,216, filed May 6, 1996, pending.

STATEMENT REGARDING FEDERALLY SPONSORED RESEARCH OR DEVELOPMENT

Not applicable.

REFERENCE TO A MICROFICHE APPENDIX, IF ANY not Applicable.

BACKGROUND OF THE INVENTION

1. Field of the Invention

The present invention relates, generally, to golf course maintenance equipment, more particularly to equipment used to maintain sand traps, or bunkers on a golf course.

2. Background Information

A golf course has specific course features of greens, fairways, and sand traps or bunkers along with many natural features including hills, creeks, lakes, and trees. Each of these course features must be maintained in a meticulous, consistent manner. Greens must be of a particular type of grass that is mowed short and rolled smooth. Fairway grass should be uniform height and thickness, rough should be just that—rough. Bunkers must be of the proper density and texture. All these facilities should be kept clear of leaves and other debris.

As a result of these exacting maintenance requirements and the large scale of the jobs, a number of specialized machines have been developed to perform specific tasks. There are numerous turf mowers and rollers, leaf sweepers and bunker rakes, all intended to help meet the requirements of a particular maintenance task.

One particular machine is the bunker rake. The sand in a bunker or sand trap should have a certain firmness, and the surface should have a particular uniform texture. This is accomplished by a using a vehicle generally resembling a garden tractor which has the bunker rake attached to the rear of it. To rake a bunker, the bunker rake is lowered and pulled along the sand behind the vehicle. When the vehicle travels from one bunker to another the rake is raised to clear the ground.

Vehicles currently used to rake bunkers typically have internal combustion engines as a source of power and hydrostatic systems or mechanical drive systems to power the ground engaging wheels. Such machines have significant disadvantages.

For example internal combustion engines are inherently noisy. Golfers or golf course neighbors can be disturbed by machines with internal combustion engines. Golf courses are typically busy from early morning until dusk, so opportunities to use machines with internal combustion engines on a golf course without disturbing golfers are typically very early morning or very late evening. Using such equipment at those hours, however, may disturb golf course neighbors. Consequently, someone may always be disturbed by equipment powered by an internal combustion engine. Internal combustion engines also inherently produce emissions from burning hydrocarbon fuels. Such emissions pollute the air and are obnoxious to people in the vicinity of an operating machine. Internal combustion engines also need periodic maintenance to change lubricating oil and tune the engine.

Another problem with these machines, particularly those using hydrostatic drives, is that they have the potential to leak or spill fuel, lubricating oil, or hydraulic fluid which can damage a golf course green or fairway, or contaminate a bunker. A spill of such fluids into a bunker would soak a significant amount of sand which would have to be removed and disposed of as hazardous waste. Machines with hydrostatic drive require periodic leak checks of the hydraulic hoses and connections, as well as frequent checking and topping off levels of hydraulic fluid. Machines without hydrostatic drive also require significant maintenance of the drive mechanism, such as adjusting or replacing belts, chains, pulleys, or sprockets.

The above problems apply to all machines used for golf course maintenance. Another problem pertains specifically to bunker rakes. To achieve the proper surface finish on the sand in the bunker, the rake must be dragged on the sand at a certain speed which is relatively slow. But because there are many sand traps on a golf course, and they are often far apart, the tractor vehicle with an internal combustion engine typically has at least one faster speed to save time in traveling between bunkers. The problem arises when the operator uses the fast speed when raking the bunker. Dragging the bunker rake too fast makes the surface too irregular. This is a common occurrence, especially when the operators of these vehicles tend to be young and or seasonal employees who may not appreciate the need for the slow speed in the bunker. While golf course maintenance supervisors can properly train a young employee and tell them the importance of driving slow when raking bunkers, it has proven difficult to curb the tendency of employees to drive fast in the bunkers.

One solution to this problem for vehicles using a hydrostatic drive is described in applicants' assignee's U.S. patent application Ser. No. 08/726,903 titled Speed Limiting Device for Utility Vehicles, filed on Oct. 7, 1986. The above application is hereby incorporated by reference. Another solution to that problem, and to the problems stated above, is provided by the applicants' invention which uses an electric drive in a vehicle for raking bunkers.

Accordingly, it is an object of the present invention to provide a riding bunker rake which uses an electric motor as a prime mover.

It is a further object of this invention to provide a riding bunker rake which uses electric power to raise and lower an attached rake assembly.

It is another object of this invention to provide a riding bunker rake with a limited maximum speed that is not fast enough to improperly groom bunkers.

It is another object of this invention to provide a riding bunker rake which has electronic regenerative braking.

BRIEF SUMMARY OF THE INVENTION

The present invention is an all electric riding bunker rake primarily suited for maintaining sand traps, or bunkers on a golf course. It is embodied as a tricycle-style vehicle having a frame supported on three wheels, an electrically actuated rake lifting mechanism at the rear of the vehicle supported by the frame, and a removable rake attachment connected to the rake lifting mechanism. The rake is dragged on the sand behind the vehicle to smooth the sand in a bunker. An electrically raised and lowered cultivator is also attached to the vehicle between the front and rear wheels to aid in breaking lumps of sand before the rake smoothes the sand.

A two-horsepower 36 volt electric motor, or optionally a two to four horsepower 48 volt electric motor, drives the rear wheels through a gear box with a 19.9:1 gear ratio designed to limit the vehicle's speed to eleven miles per hour. An electronic regenerative type braking system works in conjunction with the electric motor to slow the vehicle whenever it exceeds eleven miles per hour when driven, or two miles an hour when unattended. The rear wheels have drum brakes actuated by a foot pedal which has a parking brake linkage integral with it. The front wheel is steered by a sprocket-and-chain drive which provides a 5:1 steering ratio for the steering wheel.

The frame supports an onboard electrical battery power source and a fiber reinforced plastic articulated hood. A front portion of the hood is attached to the frame and has a control panel installed in it which has a key switch, actuator switch and battery gauge/hour meter. A raisable rear portion of the hood is supported by the frame and has an adjustable seat attached on which the operator sits to control the operation of the vehicle and the rake lifting and lowering function.

The features, benefits and objects of this invention will become clear to those skilled in the art by reference to the following description, claims and drawings.

BRIEF DESCRIPTION OF THE SEVERAL VIEWS OF THE DRAWING

FIG. 8 is a perspective view of the chassis of the vehicle.

FIG. 9 is a perspective view of the front of the chassis of FIG. 8 looking from the rear.

FIG. 10 is an exploded view of the vehicle's steering mechanism.

FIG. 11 is an exploded view of the vehicle's front fork and wheel.

FIG. 15a is an exploded view of the rake assembly.

FIG. 15b is an end view of a portion of the assembly of FIG. 15a.

FIG. 17 is an exploded view of the brake linkage.

FIG. 24 is an electrical wiring diagram for the electric bunker rake.

DETAILED DESCRIPTION

Figure 1:
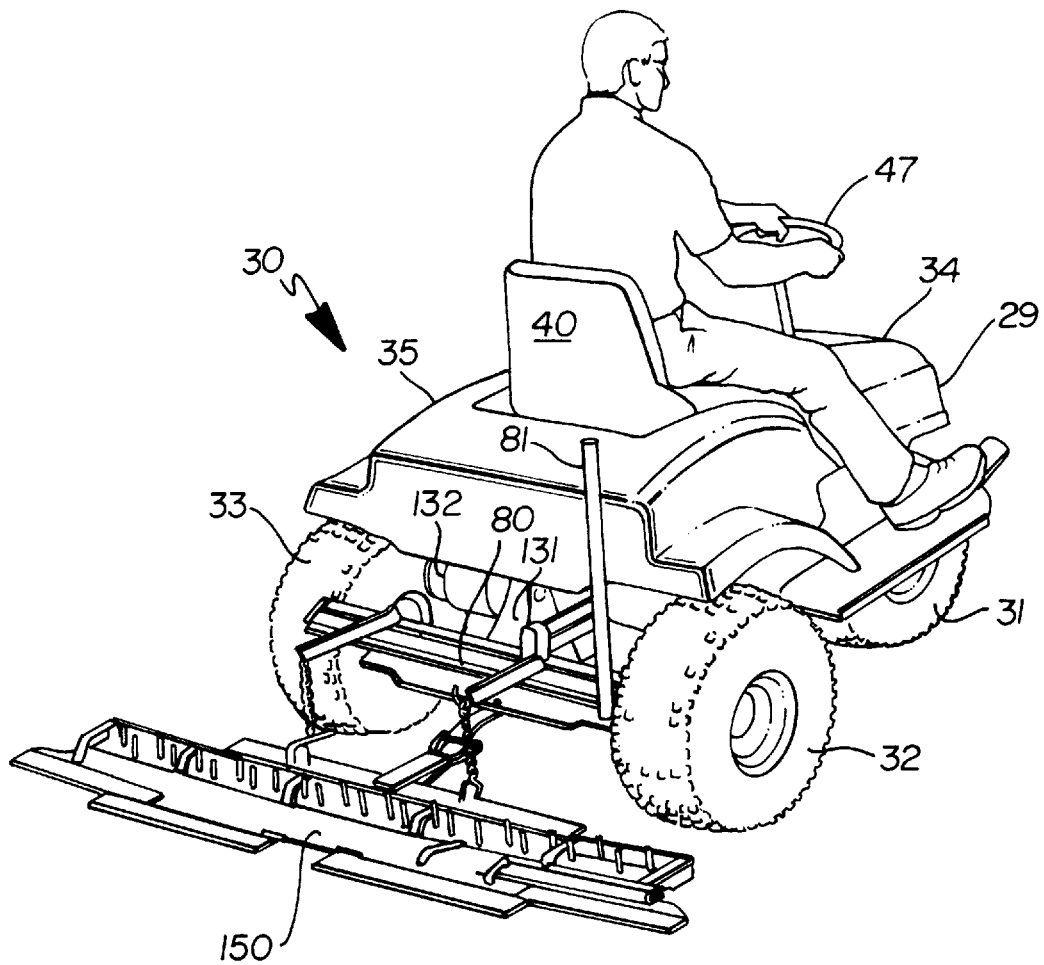
FIG. 1 is a perspective view of an electric bunker rake vehicle of the present invention.
Figure 2:
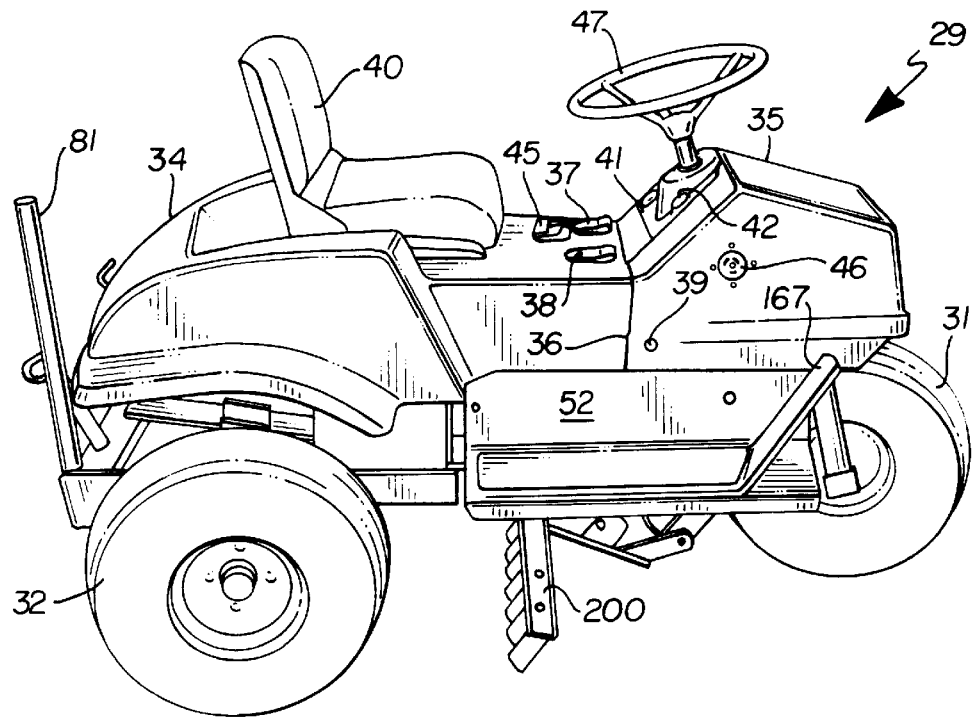
FIG. 2 is a right side view of the vehicle with the rake assembly detached.
Figure 3:
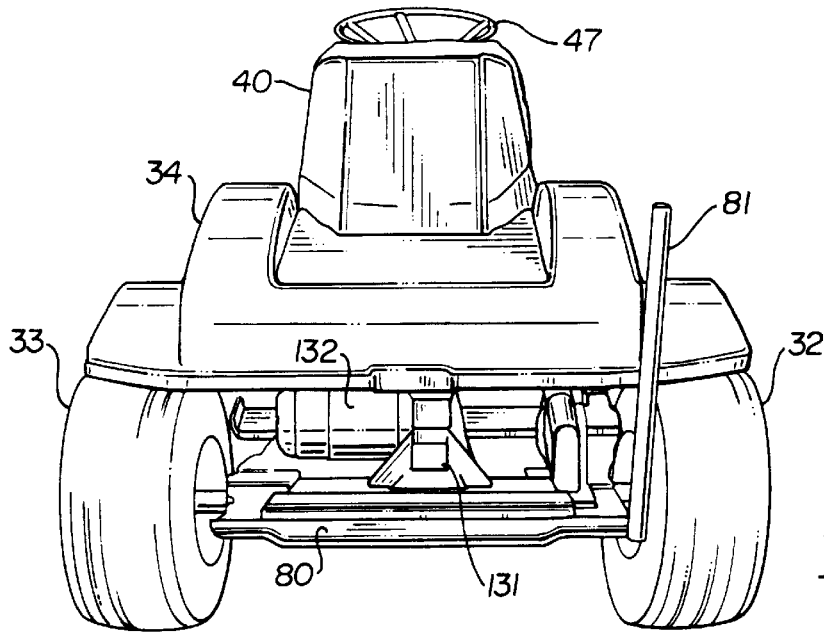
FIG. 3 is rear view of the vehicle.
Figure 4:
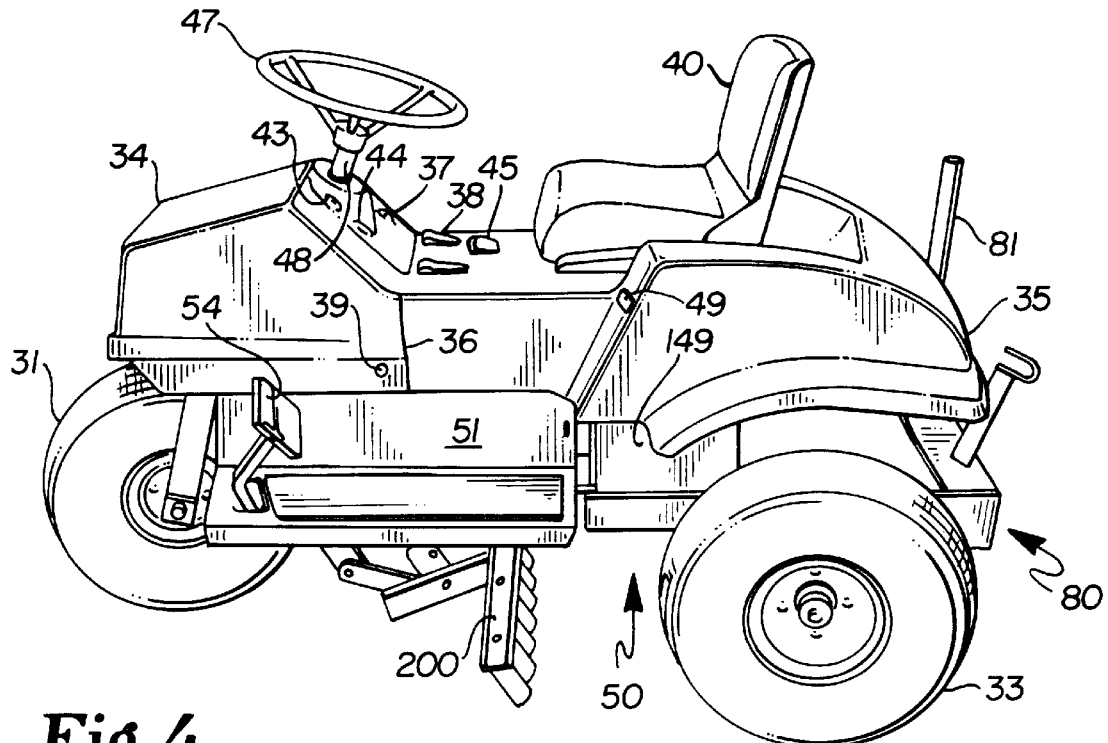
FIG. 4 is a left side view of vehicle.
Figure 5:
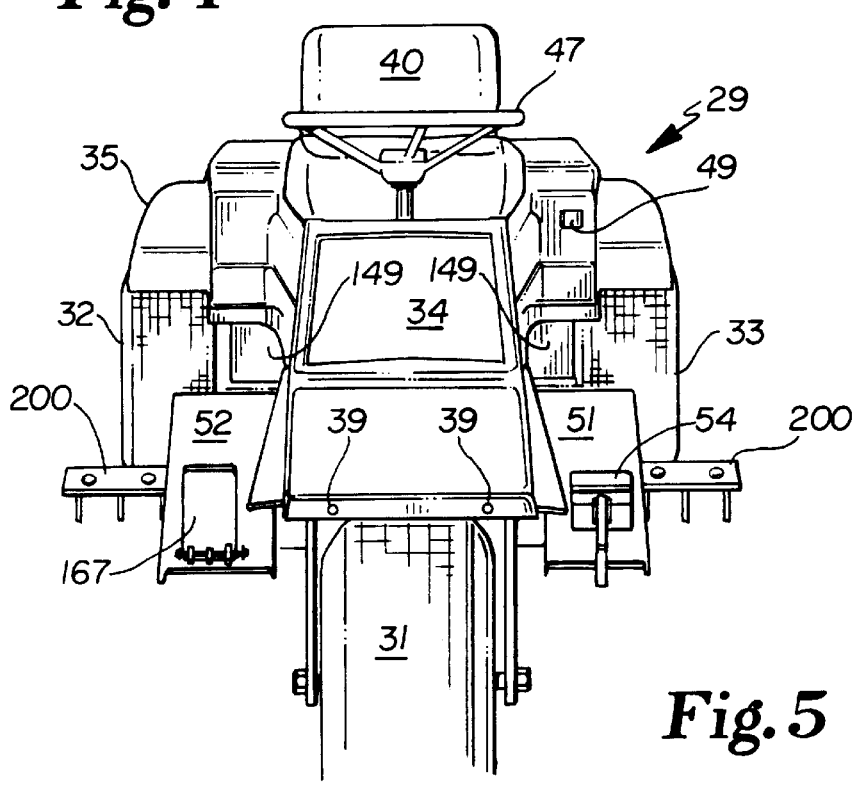
FIG. 5 is a front view of the vehicle.
Figure 6:
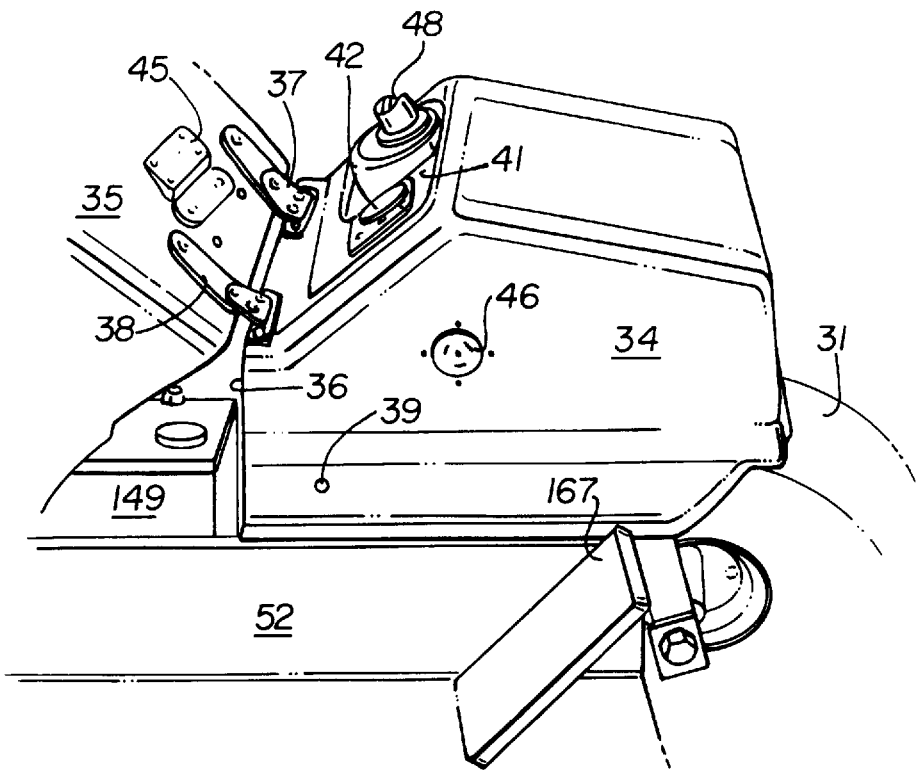
FIG. 6 is a perspective view of the front of the vehicle from the right side.

The present invention is an all electric riding bunker rake primarily suited for maintaining sand traps, or bunkers on a golf course. It is embodied as a tricycle-style vehicle having a frame supported on three wheels, an electrically actuated rake lifting mechanism at the rear of the vehicle supported by the frame, and a removable rake attachment connected to the rake lifting mechanism. The rake is dragged on the sand behind the vehicle to smooth the sand in a bunker. An electric motor drives the rear wheels through a gear box, and a regenerative type braking system works in conjunction with the electric motor to slow the vehicle whenever it exceeds eleven miles per hour when driven, or two miles an hour when unattended. The frame supports an onboard electrical battery power source and a hood to which a seat is attached on which the operator sits to control the operation of the vehicle and the rake lifting and lowering function. The rear wheels have drum brakes actuated by a foot pedal which has a parking brake linkage integral with it. An electrically raised and lowered cultivator is also attached to the vehicle between the front and rear wheels to aid in breaking lumps of sand before the rake smoothes the sand.

Referring to FIGS. 1–6, the preferred embodiment of the present invention is illustrated and generally indicated by the reference numeral 30. FIGS. 1–6 illustrate the general arrangement of the electric bunker rake 30. The preferred embodiment of electric bunker rake 30 includes an electrically powered three-wheeled vehicle 29 with a rake assembly 150 attached to the rear of vehicle 29 and a cultivator assembly 200 attached ahead of the rear wheels 32 and 33. Vehicle 29 includes frame 50 supported for movement by a steerable forward wheel 31, and rear drive wheels 32 and 33. Frame 50 supports nose cone 34 and hood 35, which are preferably made of fiber reinforced plastic. Nose cone 34 and hood 35 are joined at line 36 by hinges 37 and 38. Nose cone 34 is fastened to frame 50 by mechanical fasteners 39. Hood 35 tilts upward on hinges 37 and 38 to provide easy access to rear axle assembly 130 and batteries 149. Seat 40 is attached to hood 35 and is adjustable forward and back to accommodate different height operators. An instrument panel 41 is mounted on the rear of nose cone 34 an includes a switch 42 for raising and lowering the rake lift assembly, a key switch 43 to activate vehicle power, and a battery gauge/hour meter 44 which indicates the remaining charge in the batteries and how long the vehicle has run since last charging of the batteries. A forward/reverse selection switch 45 for selecting the direction of travel is mounted on hood 35 in front of seat 40. A charger receptacle 46 for connecting on-board batteries 149 to an external battery charger is mounted on the right side of nose cone 34. This location makes the charging connection visible to the operator so if a charging cable is connected, the operator is less likely to drive the vehicle with it still connected. Steering wheel 47 is attached to a steering shaft 48 which extends upward through nose cone 34. Left running board 51 and right running board 52 are attached to frame 50 and provide a place for the operator to step when mounting vehicle 29 and a place to rest his feet when driving. An accelerator pedal 189 and associated pedal box 193 are positioned at the front of right running board 52 and a brake pedal 54 is positioned at the front of left running board 51. Both the accelerator pedal and brake pedal are set at a comfortable distance and angle for the operator.

An electrically actuated rake lift assembly 80 is attached to the back of frame 50 to which a rake assembly 150 is connected. A rake holder tube 81 is attached to the rake lift assembly for holding the handle of a hand rake. Rear axle assembly 130 is attached to the back of frame 50 ahead of rake lift assembly 80. Rear axle assembly 130 includes gearbox 131 with electric motor 132 attached to gearbox 131. A cultivator assembly 200 is attached to frame 50 between front wheel 31 and rear wheels 32 and 33. It is raised and lowered by an electric actuator which is activated by switch 49 mounted forward-facing on hood 35 to the left of seat 40.

Figure 7:
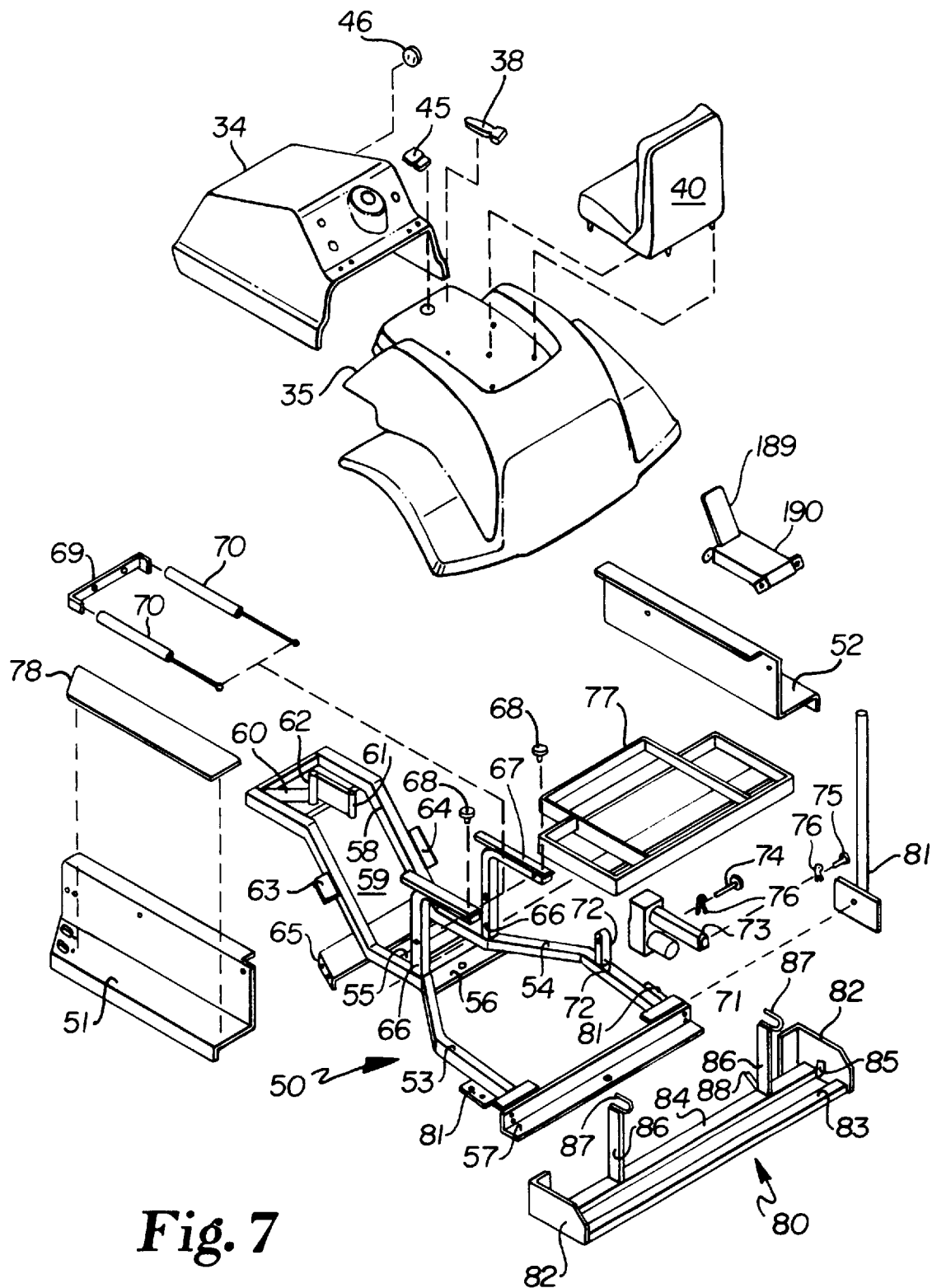
FIG. 7 is an exploded view of the chassis and hood of the vehicle.
Figure 22:
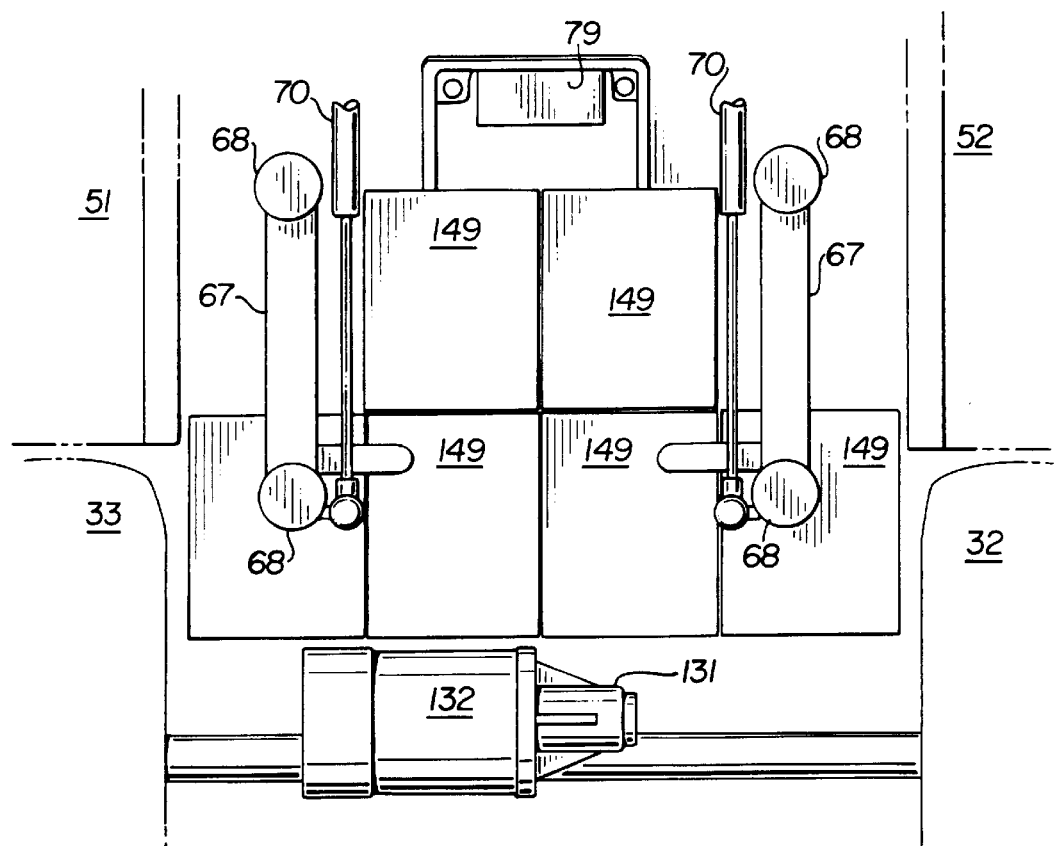
FIG. 22 is a perspective view of the batteries and cables connecting them as installed on the chassis.

Referring to FIG. 7, frame 50 is a preferably a welded steel structure, generally rectangular, with a narrower front portion and a wider rear portion. It has a left side member 53 and a right side member 54 preferably made of square tubing. Middle cross members 55 and 56, preferably made from channel, connect to side members 53 and 54 and span transversely between them near the center of frame 50. Rear cross member 57 connects to side members 53 and 54 and spans transversely between them at the back of frame 50 and provides mountings for rake lift assembly 80 and rake holder tube 81. A front portion 58 of side members 53 and 54 angles upward and then horizontal to the front. Plate 59 spans side members 53 and 54 at front portion 58. Steering bracket assembly 60 attaches to plate 59 and side members 53 and 54 near the front of frame 50. It has tube member 61 which receives shaft 48, and tube member 62 which supports a large sprocket 91 for the steering assembly 90. Left running board support 63 is attached to portion 58 of left side member 53 so it extends outward from frame 50. Right running board support 64 is attached to portion 58 of right side member 54 so it extends outward from frame 50. These provide support for the front of running boards 51 and 52. Cultivator lift bracket 65, preferably made of steel plate, attaches transversely to side members 53 and 54 just forward of cross member 55. Cowling support members 66, preferably made of square tubing, attach to side members 53 and 54 where cross member 56 attaches and extend vertically upward for a distance then bend 90 degrees to extend horizontally rearward. Hood support members 67 attach to the horizontal portion of cowling support members 66 and extend further forward than the vertical portion of cowling support members 66. These members provide support for the hood 35 and for the operator's weight where the seat 40 is attached. Two rubber mounts 68 are attached to the top of each hood support member, one near the front and one near the back. When the hood 35 is closed, it rests against mounts 68. Bracket 69 attaches to the inside of hood 35 and provides for mounting of one of two gas springs 70. The other end of gas springs 70 is attached to the back end of hood support members 67. The gas springs aid in lifting hood 35 and keep it up when fully opened (as shown in FIG. 22) for easy access to batteries 149, controller 79, and rear axle assembly 130. Rear axle mounting plates 71 are attached to side members 53 and 54 near the back of frame 50 just forward of rear cross member 57. These provide for mounting the rear axle assembly 130 (not shown). Actuator mount 72 extends vertically from right side member 54 near the front of axle mounting plate 71. It provides for pivotal attachment of an electrically powered actuator 73 through pin 74. Pin 75 connects actuator 73 to brackets 86 of rake lift assembly 80. Pins 74 and 75 are secured with hair pins 76 through their ends. Actuator 73 is preferably model number D12-05B5-04 from Warner Electric Brake and Clutch, 449 Gardener Street, South Beloit, Ill. 61080, and is capable of applying 500 pounds of force between mount 72 and brackets 86. It has an internal ball screw driven by an attached 12 volt DC motor.

Referring to FIGS. 7, 8, and 9, battery box 77 attaches on top of side members 53 and 54 forward of actuator mount 72, and extends between vertical portions of cowling support members 66 and forward of them. Running boards 51 and 52 are preferably bolted to frame 50 at upwardly angled portion 58 of side members 53 and 54 and at the vertical portion of cowling support members 66. They are also supported when in place by running board supports 63 and 64. A foot pad 78 of non-skid material is applied to most of the horizontal portion of each running board 51 and 52.

Figure 12:
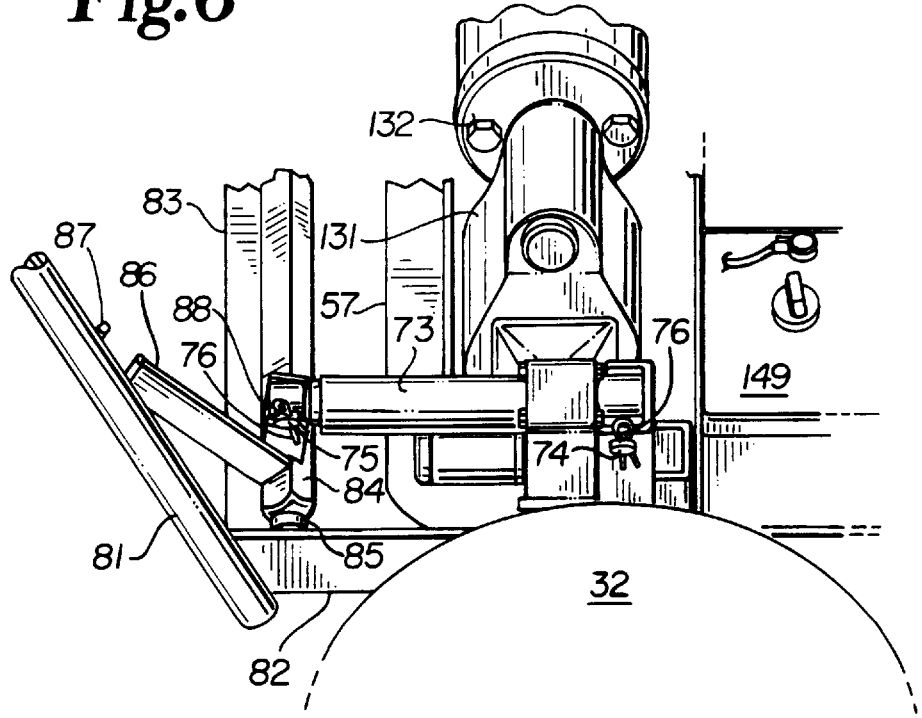
FIG. 12 is a perspective view of the right rear chassis portion having the rake lift actuator.

Referring to FIGS. 7 and 8 and 12, rake lift assembly 80 includes two side plates 82 which attach to rear cross member 57 on frame 50, stationary cross member 83 connected between plates 82, and pivoting cross member 84. Cross members 83 and 84 are preferably made of steel square tubing. Cross member 84 has round tubular ends 85, preferably welded to ends of the square tubing, which are received in and rotate in a larger diameter tubular portion (not shown) attached to plates 82. Arms 86 have hooks 87 preferably welded on one end, and the other end is preferably welded to pivoting cross member 84 so that arms 86 extend normal from pivoting cross member 84. Actuator attach brackets 88 are also welded to pivoting cross member 84 and spaced to receive the connecting portion of actuator 73 between them. Bunker rake assembly 150 hangs partially from hooks 87. When actuator 73 is retracted, arms 86 are raised upward lifting the rake assembly 150 off of the ground. When actuator is extended, pivoting cross member 84 pivots to lower arms 86 until they rest against stationary cross member 83, thereby lowering the rake assembly 150 to the ground.

Referring to FIGS. 8 and 9, a control box 79 is attached to plate 59 at the upwardly angling portion of frame 50. Control box 79 houses a solenoid 188 which activates main power form batteries 149 and distributes it through a plurality of wires to electrical components on the vehicle.

Referring to FIGS. 8, 9, and 10, steering assembly 90 includes steering shaft 48, large sprocket 91, small sprocket 92, chain 93 and idler pulley 94. Steering shaft 48 extends through tube 61 attached to frame 50 and rotates in flanged bushings 95 and machine bushings 96 mounted in ends of tube 61. Small sprocket 92 attaches to steering shaft 48 and preferably has 12 teeth of number 40 size. Large sprocket 91 preferably has 60 teeth of number 40 size. It attaches to shaft 112 from front fork assembly 110 which extends through tube 62 and rotates in a flanged bushing (not shown) mounted in tube 62. Large sprocket 91 is rotatably fixed with respect to shaft 112 by key 97. Bolt 98 threadably engages end of shaft 112 and fastens large sprocket 91 securely to shaft 112. Chain 93 wraps around large sprocket 91 and small sprocket 92 and is preferably 33 inches long with number 40 size links. Idler pulley 94 is laterally adjustable by its attach bolt 99 to tension or untension chain 93. Steering wheel 47 attaches to steering shaft 48, and steering wheel cap 100 attaches to steering wheel 47. Grease fitting 101 is installed in tube 61 to provide for lubricating steering shaft 48 in bushings 95.

Referring to FIG. 11, front fork assembly 110 includes fork 111 formed in an inverted U shape to which shaft 112 is attached extending upward from the center of the U shape. Shaft 112 is receive in and rotates in bearing 113 held in tube 62 attached to frame 50. End 114 of shaft 112 receives bolt 98 of steering assembly 90 which holds large sprocket 91 to shaft 112. Seal 115 covers bearing 113 and spacer 116 puts sprocket 91 at the proper axial location on shaft 112. Wheel 31 is attached to fork 111 in a conventional manner using a hub 117 which receive axle 118 and rotates on it. Lug nuts 119 hold wheel 31 to hub 117. Spacers 120 and 121 on axle 118 between hub 117 and fork 111 center wheel 31 in fork 111. Bushings 122 are mounted in holes 123 in fork 111 and receive axle 118 which is secured with nut 124 and cotter pin 125.

Referring to FIGS. 10 and 11, sprockets 91 and 92 create a 5:1 ratio between the number of revolutions of steering wheel 47 to the number of revolutions of front fork assembly 110. This ratio provides optimum steering ease for the operator.

Figure 13:
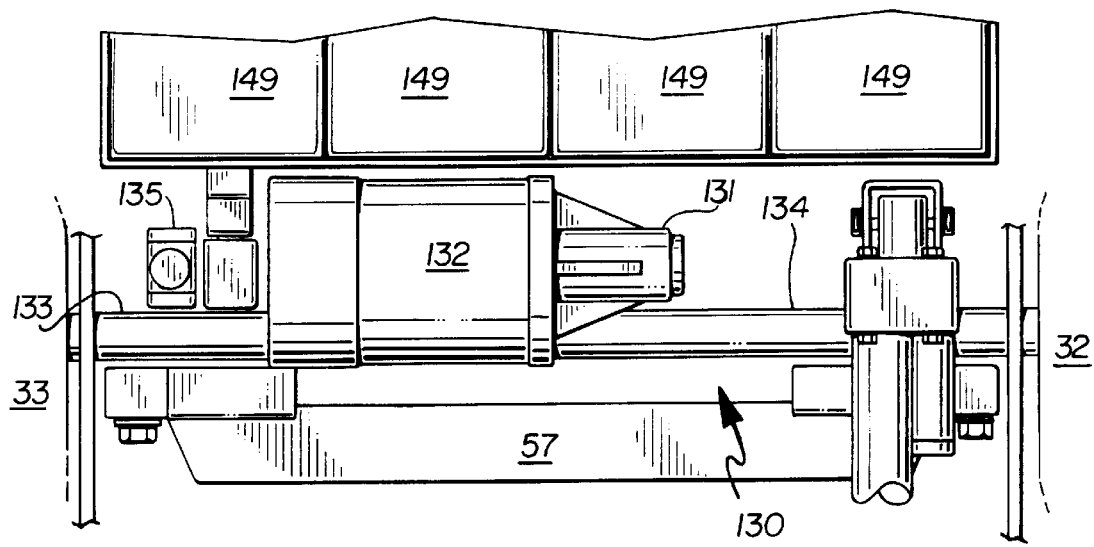
FIG. 13 is a perspective view of the left rear chassis portion having the electric motor.

Referring to FIG. 13, rear axle assembly 130 includes gearbox 131 with electric motor 132 attached to directly drive an input shaft in gearbox 131. Left and right axle tubes 133 and 134 attach to mounts 135 which connect rear axle assembly 130 to rear cross member 57 on frame 50 and enclose left and right drive shafts running from a differential assembly inside gearbox 131 to wheels 32 and 33. Gearbox 131 provides a gear ratio of 19.9:1 for input shaft revolutions to drive shaft revolutions which allows bunker rake 30 to travel no faster than eleven miles per hour. This is fast enough for efficient travel between bunkers, and slow enough that even at maximum speed, the bunkers will be properly conditioned. If the speed of a bunker rake is too high while dragging the rake over the sand, the result can be an irregularly finished bunker, which is undesirable and may require rework.

Figure 14:
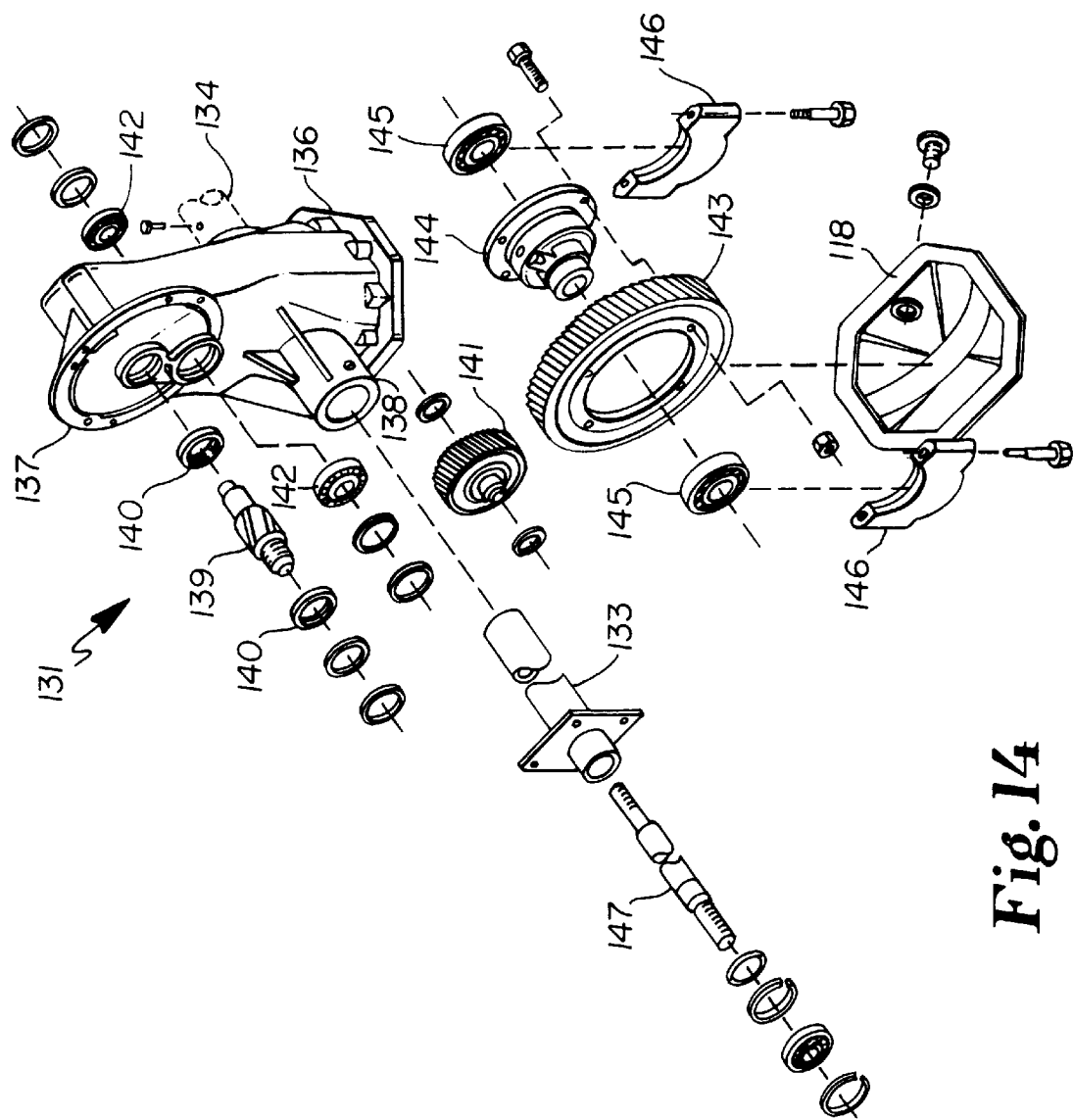
FIG. 14 is an exploded view of the gearbox assembly.

Referring to FIG. 14 showing an exploded view of gearbox 131, gearbox housing 136 has an upper flanged portion 137 to which electric motor 132 attaches, and cylindrical ports 138 which receive axle tubes 133 and 134. Electric motor 132 drives geared input shaft 139 which rotates in bearings 140 mounted in housing 136. Shaft 139 drives intermediate geared shaft 141 which rotates in bearings 142 mounted in housing 136 just below bearings 140. Geared shaft 141 drives output gear 143 which attaches to differential case assembly 144 which rotates in bearings 145 held in housing 136 by bearing caps 146. Left and right drive shafts 147 connect to differential case assembly 144 and to wheels 32 and 33 and rotate inside axle tubes 133 and 134. Bottom cover 148 attaches to and closes the bottom of housing 136.

Referring to FIGS. 15a and 15b, the rake assembly 150 attaches to the rear of frame 50 and is raised and lowered by arms 86 attached to rake lift assembly 80. Rake assembly 150 has a drawbar 151 with right hand rake frame 152, center rake frame 153, and left hand rake frame 154 bolted to it so that they extend behind drawbar 151 and are oriented approximately parallel to it. Three trowel blades 155 are connected to the rear of rake frames 152, 153 and 154, one trowel blade to one rake frame. Each trowel blade is angled back and downward from the rake frame to which it is attached. A plurality of threaded rake teeth 156 serve both as mechanical fasteners to attach trowel blades 155 and as rake teeth to condition the sand over which rake assembly 150 is dragged. Rake teeth 156 extend vertically downward from each rake frame and are located at the front of trowel blades 155. Rake assembly 150 preferably has twenty five rake teeth 156. Two Lexan finishing blades 157 also attach to rake frames 152, 153 and 154. Finishing blades 157 are staggered longitudinally with the trowel blades 155 so the gaps between trowel blades are approximately centered on a finishing blade. Connecting links 158 allow finishing blades 157 to be located further back from trowel blades 155. Like the trowel blades, the finishing blades are angled back and downward. Hitch 160 attaches to rear cross member 57 on frame 50, and drawbar 151 has clevis bracket 159 attached which connects to hitch 160 with clevis pin 161 which allows rake assembly 150 to pivot up or down in hitch 160 as rake assembly 150 is raised or lowered.

Referring to FIGS. 7 and 15a, attached to drawbar 151 are flexible tensionable linkages 162, such as chains, cables, or ropes, which connect to hooks 87 on arms 86 of rake lift assembly 80. As arms 86 are raised or lowered, flexible tensionable linkages 162 raise or lower rake assembly 150. When rake assembly 150 is fully lowered, arms 86 rest on stationary cross member 83 and flexible tensionable linkages 162 are slack.

Figure 16:
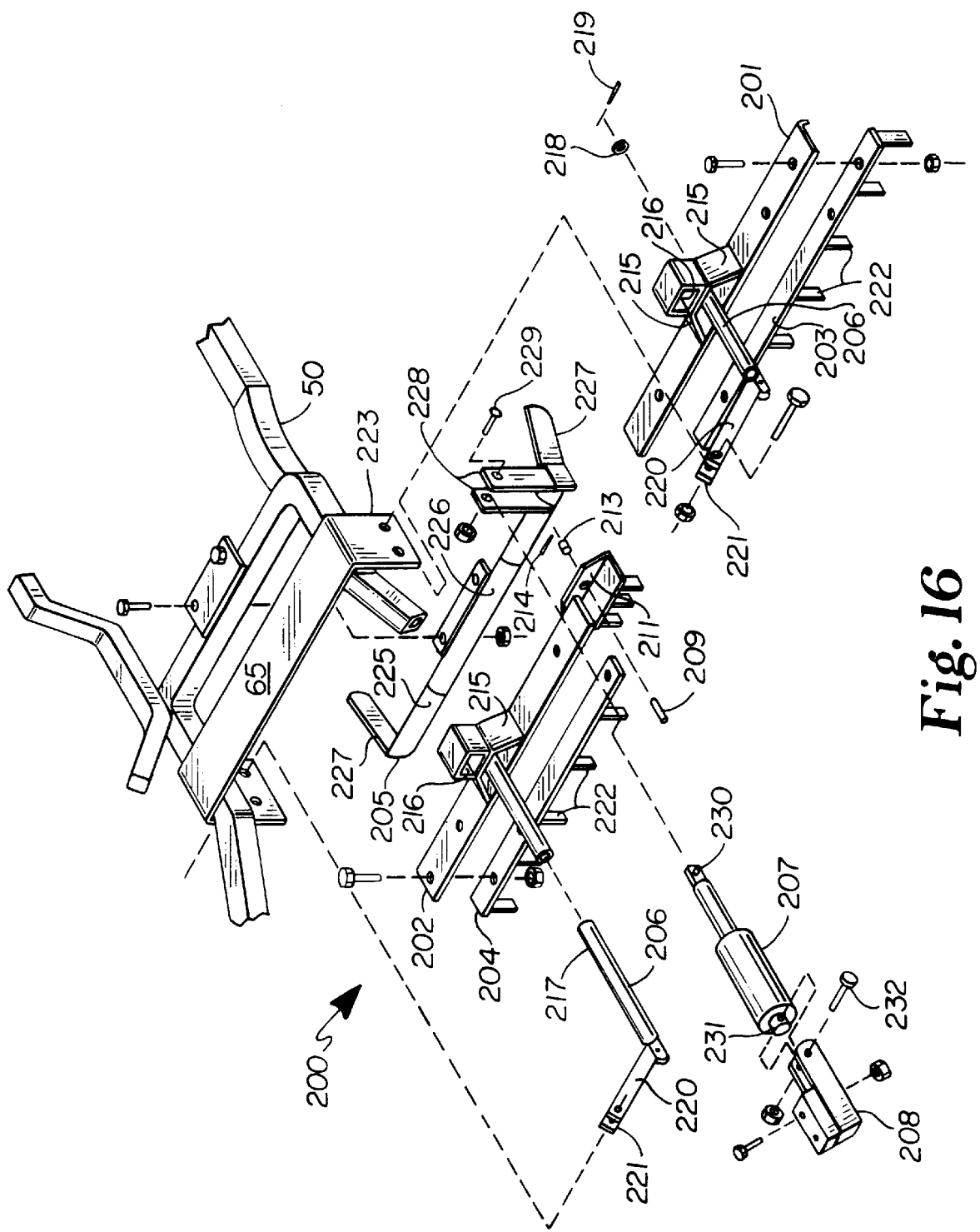
FIG. 16 is an exploded view of the cultivator assembly.

Besides rake assembly 150 dragging behind vehicle 29 to condition the sand in a bunker, cultivator assembly 200 is attached to vehicle 29 ahead of wheels 32 and 33 to loosen and break up lumps of sand which occur when sand is wet and/or over trampled. Referring to FIG. 16, cultivator assembly 200 includes left and right frame members 201 and 202 respectively, left and right cultivator blades 203 and 204, cultivator lift assembly 205, hitch arms 206, actuator 207 and actuator attachment bracket 208. Left and right frame members are attached together by inserting pin 209 on left frame member 201 through aperture 212 in flange 211 on right frame member 202 and installing washer 213 and cotter pin 214. Blades 203 and 204 are bolted to bottoms of frame members 201 and 202 respectively. Blades 203 and 204 have tines 222 extending downward from them which loosen and break up lumps of sand through which cultivator assembly 200 is dragged. Tines 222 have a generally thin rectangular cross section and are oriented so that the narrow profile is pulled through the sand. Frame members 201 and 202 have a pair of tubes 215 and 216 mounted on top of them. Lower tubes 215, preferably having trapezoidal shape, receive the rear portion 217 of hitch arms 206 which are secured with washers 218 and roll pins 219. Upper tubes 216, preferably having a rectangular shape, receive arms 227 of cultivator lift assembly 205. Rear portion 217 of hitch arms 206 is preferably a rod of round cross section approximately ¾ inch diameter. Hitch arms 206 have a front portion 220 angled upward from rear portion 217 which ends in a clevis 221 which attaches to tabs 223 on cultivator lift bracket 65 attached to vehicle 29.

Cultivator lift assembly 205 bolts to a cross member on frame 50. Assembly 205 has an inner tube 225 which rotates in outer tube 226. Inner tube 225 has arms 227 at its ends extending rearward from inner tube 225. Bracket 228 is attached to inner tube 225 and receives end 230 of actuator 207 which is secured with bolt 229. Actuator attachment bracket 208 bolts to running board 51 and receives end 231 of actuator 207 which is secured with bolt 232.

Cultivator assembly 200 is put together by first attaching lift assembly 205 to frame 50, actuator attachment bracket 208 to running board 51, and assembling cultivator frame members 201 and 202 and blades 203 and 204. Rear portion 217 of hitch arms 206 are then installed in tubes 215, then tubes 216 are installed on arms 227 of lift assembly 205. Clevises 221 of hitch arms 206 are then attached to cultivator lift bracket 65. Actuator 207 is then attached between brackets 208 and 228. Actuator 207 is similar to actuator 73 used for raising and lowering rake assembly 150, but actuator 207 is only capable of applying 75 pounds of force. It is preferably a model number S12-17A8-04 from Warner Electric Brake and Clutch, 449 Gardener Street, South Beloit, Ill. 61080.

An double pole double throw electrical switch 49 is installed in hood 34 and electrically connected between batteries 149 and actuator 207 to activate actuator 207 to raise and lower cultivator assembly 200.

Referring to FIG. 17, brake linkage assembly 165 includes a brake pedal arm 166 and a brake pedal foot pad 54 which pivots on bolt 168 and bushing 169 received by bracket 170 attached to frame 50. Brake pedal arm 166 has arm 171 which connects to brake yoke 172 which pulls through compression spring 173 on the front end of threaded rod 174. Clevis yoke 175 is attached to the back end of rod 174 which connects to the middle of an equalizer bar 176. Left and right brake cables 177 and 178 attach to ends of equalizer bar 176 through yokes 179. Brake cables 177 and 178 also attach to conventional drum brakes in wheels 32 and 33.

When brake pedal arm 166 is pushed, force is equally applied to brake cables 177 through equalizer bar 176. Compression spring 173 keeps assembly 165 properly tensioned and allows brake pedal arm 166 to move to lock and release the parking brake, which is integrated with brake pedal arm 166 and brake pedal foot pad 54.

Figure 18:
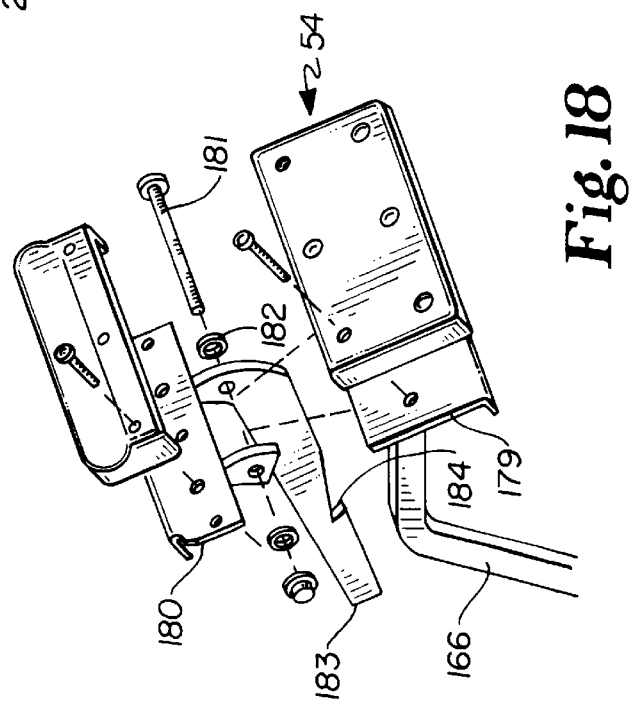
FIG. 18 is an partially exploded view of a portion of the brake pedal assembly.
Figure 19A:
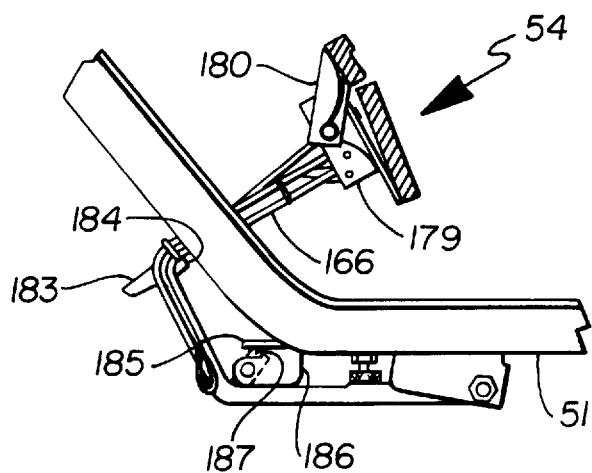
FIG. 19a is a side view of the brake pedal assembly during normal driving.

Referring to FIGS. 18 and 19*a*, brake pedal foot pad 54 has a lower portion 179 which attaches to brake pedal arm 166, and an articulated upper portion 180 attached through pin 181 to lower portion 179. Upper portion 180 is spring loaded by springs 182 to normally be approximately in line with lower portion 179. Arm 183 is attached to upper portion 180 and extends forward and downward from it. Arm 183 has a notch 184 on is lower edge which engages a lip 185 on latch arm 186 attached to the bottom of left running board 51. Latch arm 186 also has a pivoting stop block 187.

Figure 19B:
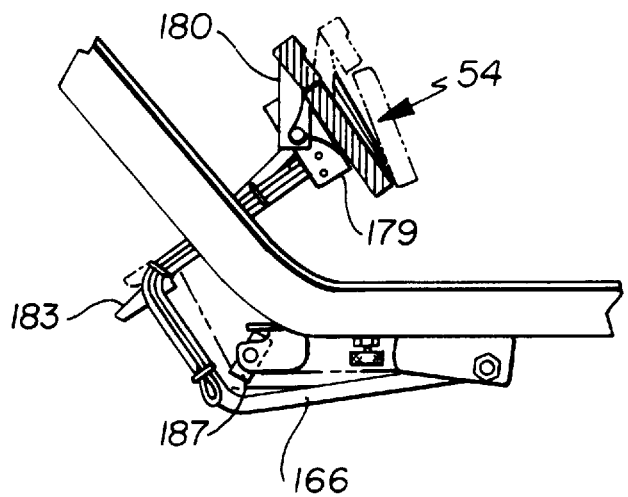
FIG. 19b is a side view of the brake pedal assembly during normal braking.
Figure 19C:
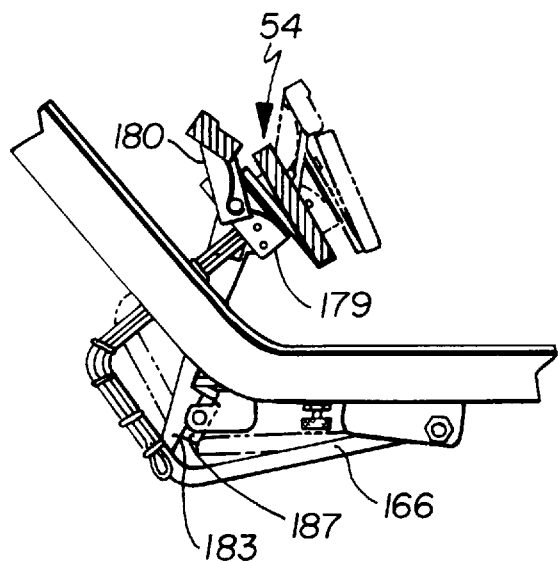
FIG. 19c is a side view of the brake pedal assembly during engagement of the parking brake.

The normal driving position of the brake pedal foot pad 54 is shown in FIG. 19*a*. Pressure is applied to the lower portion 179 of the brake pedal foot pad 54 during normal braking as shown in FIG. 19*b*. The brake pedal arm 166 moves downward to engage brakes. Upper and lower portion 180 and 179 of the brake pedal foot pad 54 remain aligned and arm 183 remains up. FIG. 19*c* illustrates the method for engaging the parking brake. First, the brake pedal foot pad 54 is depressed as during normal braking as shown in FIG. 19*b*. Then pressure is applied to the upper portion 180 of the brake pedal foot pad 54 to pivot arm 183 downward until it hits stop block 187 which properly positions arm 183 so notch 184 can engage lip 185. Additional pressure is applied to the brake pedal foot pad 54 to move the brake pedal arm 166 enough for notch 184 to engage lip 185, which then holds brake pedal arm 166 in that position to keep the brakes engaged. This additional movement is facilitated by compression spring 173 of brake linkage 165. To release the parking brake, pressure is again applied to the lower portion 179 of the brake pedal foot pad 54 until notch 184 disengages from lip 185, at which point springs 182 will pivot upper portion 180 and arms 183 back up, thereby disengaging the parking brake. The parking brake feature is useful when the electric bunker rake 30 is parked on a hill. The words "HILL BRAKE" have been molded into the upper portion 180 of the brake pedal foot pad 54.

Figure 20:
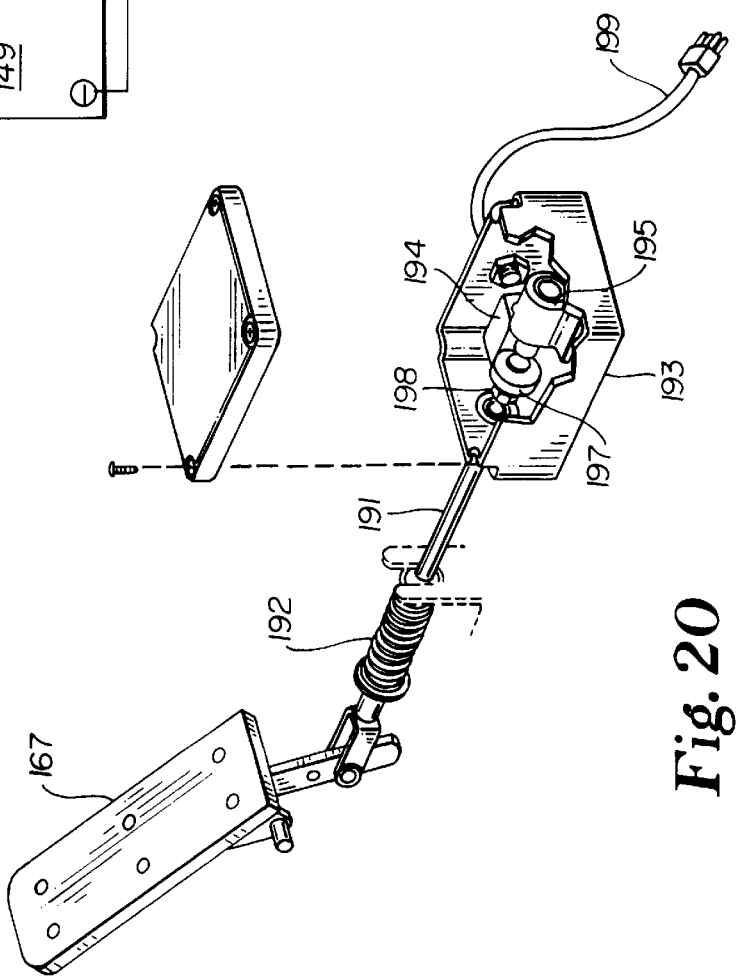
FIG. 20 is a perspective view of the accelerator pedal and devices inside the pedal box.

Referring to FIGS. 7 and 20, a pedal box 190 with accelerator pedal 189, designed and supplied by E-Z-GO Textron of Augusta, Ga. is attached to right running board 52. Inside pedal box 190 is a rod 191 with one end connected to pedal 189 and return spring 192 which biases pedal 189 upward. The other end of rod 191 extends through a housing 193 which holds the pedal position micro switch 194 and a solid state inductive throttle sensor (ITS) 195 electrically connected to controller 79 by cable 199. The controller is wired to the batteries and develops a regulated power supply for ITS 195. A metal plunger 196 is attached to the end of rod 191 in housing 193 and slideably engages ITS 195. As accelerator pedal 189 moves, plunger 196 moves in and out of ITS 195. The plunger position relative to ITS 195 varies the current in ITS 195 which is fed back to controller 79 which interprets this change in current and then supplies the appropriate power to the electric motor.

Microswitch 194 sends a signal to controller 79 to indicate whether the accelerator pedal 189 is depressed or not. Cam 197 attached to rod 191 activates microswitch 194 as pedal 189 is depressed. Cam 197 can be positioned along rod 191 so that microswitch 194 is activated by the desired travel of accelerator pedal 189. Lock nuts 198 secure cam 197 on rod 191.

Microswitch 194 works in conjunction with an electronic regenerative type braking system activated by controller 79. The regenerative braking system uses electric motor 132 to assist in braking vehicle 29. When the vehicle 29 is being driven, the regenerative braking system will slow the vehicle if it travels faster than eleven miles per hour. If the electric bunker rake 30 is unattended and begins to roll faster than two miles per hour, a beeper sounds and the regenerative braking system slows the unit to two miles per hour and holds it at that speed to give the operator time to stop the vehicle. The signal from microswitch 194 determines whether the regenerative braking system is activated when the electric bunker rake reaches a speed of eleven miles per hour or two miles per hour. The signal corresponding with accelerator pedal 189 being depressed triggers the eleven mile per hour response, and the signal corresponding to accelerator pedal being up triggers the two mile per hour response.

The regenerative braking system is integral with electric motor 132, and controller 79. When the regenerative braking system is activated, controller 79 reverses the polarity on the field coils of electric motor 132 effectively turning electric motor 132 into a generator which resists rotational motion and slows the speed of vehicle 29. A small trickle charge of electricity is put back into the battery system from operation of the regenerative braking system.

Controller 79, electric motor 132, accelerator pedal box 190, and the electronic regenerative braking system integral with them are all supplied by E-Z-Go Textron and are designed to work together on 36 volts.

Electric bunker rake 30 is also equipped with a run-tow/maintenance switch 260. This switch is used as a safety in the electronic system. With the switch 260 in tow/maintenance position, the controller 79 is deactivated and the electronic regenerative braking system is deactivated. This allows the vehicle 29 to be towed or roll freely, and it will not operate. With the switch 260 in the tow/maintenance position, the controller 79 and electronic braking system are activated, and the electric bunker rake 30 will operate correctly.

Figure 21:
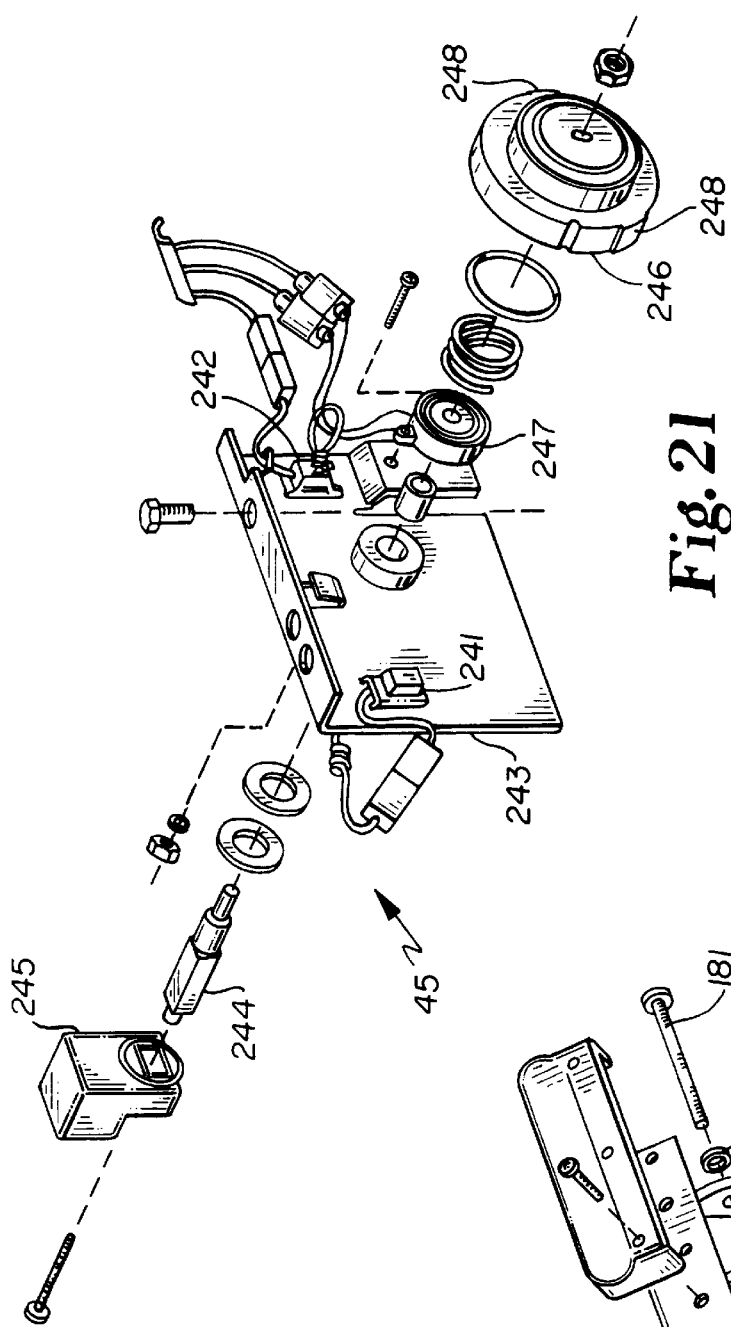
FIG. 21 is an exploded view of the forward/reverse switch.

Referring to FIG. 21, electric bunker rake 30 also has a forward/reverse selection switch (FRS) 45 which selects the direction electric motor 132 rotates and thereby selects the direction vehicle 29 travels. The FRS 45 has two microswitches 241 and 242 mounted on one side of bracket 243 and electrically connected to controller 79. A rotatable shaft 244 passes through bracket 243 and has a handle 245 attached to one end and disposed on the opposite side of bracket 243 that switches 241 and 242 are on. Cam 246 is attached to the other end of shaft 244 and is disposed between microswitches 241 and 242. A sounding device 247, which will make a steady beep when unit is in reverse, is also mounted on shaft 244 between bracket 243 and cam 246. Sounding device 247 will make a broken beeping sound when the electronic braking system is activated. Cam 246 has lobes 248 which cause microswitch 241 or 242 to activate depending on the rotated position of cam 248. When handle 245 is in the neutral position, cam 246 is rotatably positioned so that neither microswitch 241 or 242 is activated and electric motor is not energized. When handle 245 is in the forward or run position, cam 246 is rotatably positioned so that microswitch 241 is activated and electric motor 132 is energized so as to run forward. When handle 245 is in the reverse position, cam 246 is rotatably positioned so that microswitch 242 is activated, sounding device 247 is activated, and electric motor 132 is energized so as to run backward.

Figure 23:
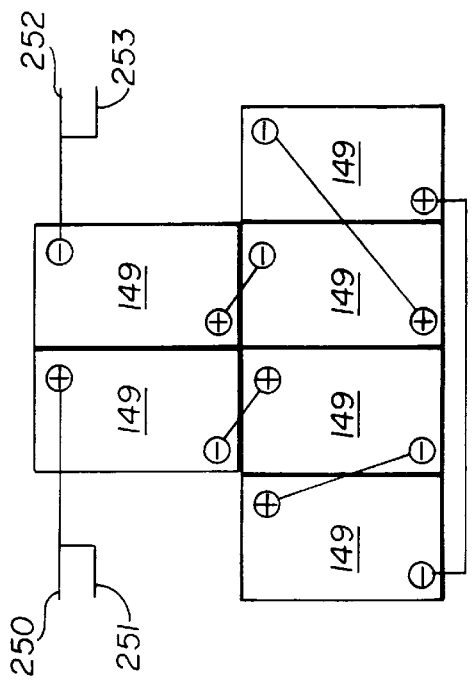
FIG. 23 is a wiring diagram for the batteries.

Referring to FIGS. 22 and 23, batteries 149 are mounted in battery box 77 between controller 79 and electric motor 132 and under hood support members 67. Batteries 149 preferably are six six-volt lead-acid rechargeable batteries, preferably Trojan T125 batteries which are designed to take a full charge and keep the charge longer than most other batteries. Batteries are wired in series as shown in FIG. 23 to produce 36 volts to power a two-horsepower electric motor 132 which is designed to run on 36 volts as is the controller 79 and the electronic braking system. Electric bunker rake 30 has the capability to rake sand traps on an average of six to seven hours per one twelve-hour charge.

Referring to FIGS. 23 and 24 showing wiring diagrams for electric bunker rake 30, one positive cable 250 from the 36-volt series wiring of batteries 149 is connecting to solenoid 188 on controller 79, and another positive cable 251 is connected to charger receptacle 46. One negative cable 252 from the 36-volt series wiring of batteries 149 is connecting to the B- terminal on controller 79, another negative cable 253 is connected to charger receptacle 46, and a third and fourth negative wires 256 and 257 are connected to actuator switches 42 and 49 respectively. A 12 volt tap is taken via wire 255 from the positive terminal of battery 258 connected in series with the battery to which the negative cables 256 and 257 are connected. Controller 79 has a ten-wire cable connecting it to various other components as shown. Key switch 43 activates solenoid 188 which then powers motor 132 and other systems through controller 79.

An alternate embodiment of bunker rake 30 uses a 48 volt system and has eight six-volt batteries connected in series and an electric motor, controller, and other components designed to run on a 48 volt system.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A riding bunker rake, comprising:

(a) a frame;

(b) a plurality of ground engaging wheels supporting said frame;

(c) a battery power source;

(d) a prime mover adapted to use electrical energy from said battery power source to provide driving torque to at least one of said ground engaging wheels;

(e) a rake assembly attached to said frame and disposed behind said ground engaging wheels, said rake assembly being adapted to smooth sand over which said rake assembly is dragged, said rake assembly being adapted to selectively be lowered and raised to engage or disengage said sand;

(f) means for selectively raising and lowering said rake assembly;

(g) a liftable cultivator assembly disposed ahead of said rake assembly, said cultivator assembly including an elongated tine bar oriented generally transverse to travel direction of said riding bunker rake and a pair of hitch members, said tine bar having a plurality of tines extending vertically downward, said tines having a generally thin rectangular cross section and being oriented so that their narrow profile faces forward, said tine bar having two pairs of receptacles attached on top of said tine bar. each pair of receptacles having a lower receptacle adjacent said tine bar and an upper receptacle above and adjacent said lower receptacle, both upper and lower receptacles opening forward, said lower receptacle receiving a rear portion of said hitch member, said upper receptacle receiving a portion of said means for raising and lowering, said hitch members having elongated bodies with-a forward portion attaching to said frame of said riding bunker rake, and a rear portion which is received in and attaches to said lower receptacle; and (h) means for selectively raising and lowering said cultivator assembly.

2. The riding bunker rake of claim 1, wherein said riding bunker rake further includes at least three ground engaging wheels, said prime mover being located between two of said ground engaging wheels and providing torque to both of said two wheels.

3. The riding bunker rake of claim 2, wherein said frame has a narrower front portion and a wider back portion, said prime mover and said two wheels receiving torque from said prime mover being located at said back portion of said frame.

4. The riding bunker rake of claim 1, wherein said driving torque provided to said at least one wheel is through a drive shaft connected between said prime mover and said at least one wheel, said prime mover including an electric motor and a reducer which ratios revolutions of said electric motor to revolutions of said drive shaft.

5. The riding bunker rake of claim 2, wherein said driving torque provided to said two wheels is through two drive shafts, each drive shaft being disposed between and connected to said prime mover and one of said two wheels, said prime mover including an electric motor and a gearbox, said gearbox having a rotatable input shaft driven by said electric motor, a differential gear assembly, each of said drive shafts being attached to said differential gear assembly, and a plurality of intermeshing gears connecting said input shaft to said differential gear assembly to thereby ratio revolutions of said electric motor to revolutions of said drive shafts.

6. The riding bunker rake of claim 5, wherein said ratio of revolutions of said electric motor to revolutions said drive shafts is 19.9 to 1.

7. The riding bunker rake of claim 4, further comprising an electric control system which varies speed of said riding bunker rake by varying rotational speed of said electric motor.

8. The riding bunker rake of claim 4, further comprising an electronic regenerative braking system which detects speed of said riding bunker rake and reverses field polarity on said electric motor when a threshold speed of said riding bunker rake is exceeded, thereby operating said electric motor as a generator which reduces speed of said riding bunker rake and puts some electrical energy back into said battery power source.

9. The riding bunker rake of claim 8 wherein said threshold speed is 11 miles per hour when said riding bunker rake is being driven.

10. The riding bunker rake of claim 8 wherein said threshold speed is 2 miles per hour when said riding bunker rake is not being driven.

11. The riding bunker rake of claim 8 wherein said threshold speed is dual, one at 11 miles per hour when said riding bunker rake is being driven, and one at 2 miles per hour when said riding bunker rake is not being driven.

12. The riding bunker rake of claim 1, further comprising a foot-pedal activated braking system including a brake pedal pivotably attached to said frame, said brake pedal having a first end and a second end, a foot pad attached to said first end, a linkage attached to said second end, at least one cable attached to said linkage and to brakes on at least one ground engaging wheel.

13. The riding bunker rake of claim 12, wherein said foot pad has two portions, a first portion being fixed to said brake pedal, a second portion being articulated with said first portion, said second portion having a latching mechanism attached to it which locks said brakes in an engaged condition when said first portion is depressed to engage said brakes and said second portion is then further depressed to activate said latching mechanism, whereby said braking system functions as a parking brake.

14. The riding bunker rake of claim 1, further comprising a steering system for steering at least one of said ground engaging wheels, said steering system including a first rotatable shaft extending generally upward from said frame and having a manually operated steering device at its upward end, a second rotatable shaft approximately parallel to said first shaft and extending generally downward from said frame and attaching to a mechanism holding said at least one ground engaging wheels, a smaller sprocket attached to said first shaft, a larger sprocket attached to said second shaft, said sprockets being aligned approximately planarly, and an endless chain connecting said sprockets so that said second shaft rotates as said first shaft is rotated.

15. The riding bunker rake of claim 14, wherein said larger sprocket has approximately five times as many teeth as has said smaller sprocket.

16. The riding bunker rake of claim 1, further comprising a hood covering said frame.

17. The riding bunker rake of claim 16, wherein said hood is constructed of fiber reinforced plastic.

18. The riding bunker rake of claim 16, wherein said hood has two portions, a first portion being fastened to said frame, a second portion being hinged to said first portion and supported by said frame, said second portion being raisable to provide access to said battery power source and said prime mover.

19. The riding bunker rake of claim 18, wherein said second portion of said hood has means to assist raising it, said means to assist raising also maintaining said hood in a raised position after said hood has been raised.

20. The riding bunker rake of claim 18, wherein said second portion of said hood is located rearward from said first portion, and further comprising a seat attached to said second portion of said hood on which an operator of said riding bunker rake sits while operating said riding bunker rake.

21. The riding bunker rake of claim 16, further comprising a charging receptacle electrically connected to said battery power source, said charging receptacle being mounted on said hood so as to be visible to an operator of said riding bunker rake sitting in a normal operating position.

22. The riding bunker rake of claim 1, wherein said rake assembly includes an elongated drawbar oriented generally transverse to travel direction of said riding bunker rake, a hitch attached to said drawbar near its center which connects to said frame, at least one flexible tensionable linkage having an end attached to said drawbar, and another end which attaches to said means for selectively raising and lowering said rake assembly, and a plurality of trowel blades and finishing blades attached to said drawbar, said trowel blades having a front portion with a plurality of tines extending vertically downward along said front portion and having a rear portion that is a thin plate angled downward and rearward form said tines, said finishing blades having a thin plate angled downward and rearward, said finishing blades being disposed behind said trowel blades and staggered laterally with said trowel blades to smooth sand flowing between said trowel blades.

23. The riding bunker rake of claim 1, wherein said means for selectively raising and lowering said rake assembly includes a rotatable bar having at least one rake lifting arm and at least one actuator attach arm extending approximately normal from said bar, an actuator connected between said at least one actuator arm and said frame, said at least one rake lifting arm being connected to a flexible tensionable linkage attached to said rake assembly, said actuator being movable to push or pull on said at least one actuator arm, thereby rotating said bar which lowers or raises said rake assembly through said at least one rake lifting arm and said flexible tensionable linkage.

24. The riding bunker rake of claim 23, wherein said actuator is electrically powered.

25. The riding bunker rake of claim 1, wherein said battery power source provides a maximum of between about 36 and about 48 volts of electrical force.

26. The riding bunker rake of claim 1, wherein said means for selectively raising and lowering said cultivator assembly includes a rotatable bar segment having a cultivator lifting arm at each end and at least one actuator attach arm extending approximately normal from said bar, an actuator connected between said at least one actuator arm and said frame, said cultivator lifting arms being receive in said upper receptacles on said tine bar, said actuator being movable to push or pull on said at least one actuator arm, thereby rotating said bar which lowers or raises said cultivator assembly.

27. The riding bunker rake of claim 26, wherein said actuator is electrically powered.

28. A riding electric bunker rake, comprising:

(a) a frame;

(b) at least three ground engaging wheels supporting said frame;

(c) a battery power source;

(d) a prime mover adapted to use electrical energy from said battery power source to provide driving torque to two of said ground engaging wheels through two drive shafts, each drive shaft being disposed between and connected to said prime mover and one of said two wheels, said prime mover including an electric motor and a gearbox, said gearbox having a rotatable input shaft driven by said electric motor, a differential gear assembly, each of said drive shafts being attached to said differential gear assembly, and a plurality of intermeshing gears connecting said input shaft to said differential gear assembly to thereby ratio revolutions of said electric motor to revolutions said drive shafts;

(e) an electric control system which varies speed of said riding bunker rake by varying rotational speed of said electric motor;

(f) a rake assembly attached to said frame and disposed behind said ground engaging wheels, said rake assembly being adapted to smooth sand over which said rake assembly is dragged, said rake assembly being adapted to selectively be lowered and raised to engage or disengage said sand, said rake assembly including an elongated drawbar oriented generally transverse to travel direction of said riding bunker rake, said drawbar having a center, a hitch connected to said frame and attached to said drawbar near said drawbar center, at least one flexible tensionable linkage having an end attached to said drawbar, and another end which attaches to a mechanism for selectively raising and lowering said rake assembly, and a plurality of trowel blades and finishing blades attached to said drawbar, said trowel blades having a front portion with a plurality of tines extending vertically downward along said front portion and having a rear portion that is a thin plate angled downward and rearward form said tines, said finishing blades having a thin plate angled downward and rearward, said finishing blades being disposed behind said trowel blades and staggered laterally with said trowel blades to smooth sand flowing between said trowel blades; and (g) a mechanism for selectively raising and lowering said rake assembly, said mechanism including a rotatable bar having at least one rake lifting arm and at least one actuator attach arm extending approximately normal from said bar, an electrically powered actuator connected between said at least one actuator arm and said frame, said at least one rake lifting arm being connected to a flexible tensionable linkage attached to said rake assembly, said actuator being movable to push or pull on said at least one actuator arm, thereby rotating said bar which lowers or raises said rake assembly through said at least one rake lifting arm and said flexible tensionable linkage.

29. A riding electric bunker rake, comprising:

(a) a frame constructed primarily of steel tubular members, said frame having a narrower front portion and a wider back portion;

(b) three ground engaging wheels supporting said frame, two of said wheels being located at said back portion of said frame and receiving torque from a prime mover;

(c) a battery power source providing a maximum of between about 36 and about 48 volts of electrical force;

(d) an prime mover located between said two ground engaging wheels, said prime mover adapted to use electrical energy from said battery power source to provide driving torque to said two of said ground engaging wheels through two drive shafts, each drive shaft being disposed between and connected to said prime mover and one of said two wheels, said prime mover including an electric motor and a gearbox, said gearbox having a rotatable input shaft driven by said electric motor, a differential gear assembly, each of said drive shafts being attached to said differential gear assembly, and a plurality of intermeshing gears connecting said input shaft to said differential gear assembly to thereby ratio revolutions of said electric motor to revolutions of said drive shafts, said ratio being 19.9 to 1;

(e) an electric control system which varies speed of said riding bunker rake by varying rotational speed of said electric motor;

(f) an electronic regenerative braking system which detects speed of said riding bunker rake and reverses field polarity on said electric motor when a threshold speed of said riding bunker rake is exceeded, thereby operating said electric motor as a generator which reduces speed of said riding bunker rake and puts some electrical energy back into said battery power source, said threshold speed being 11 miles per hour when said riding bunker rake is being driven, or 2 miles per hour when said riding bunker rake is not being driven;

(g) a foot-pedal actuated braking system including an articulated foot pad and having an integral parking brake activated by a portion of said articulated foot pad;

(h) a hood covering said frame, said hood having a first portion fastened to said frame and a second portion hinged to said first portion and supported by said frame, said second portion being raisable to provide access to said battery power source and said prime mover;

(i) a seat attached to said second portion of said hood on which an operator of said riding bunker rake sits while operating said riding bunker rake;

(j) a rake assembly attached to said frame and disposed behind said ground engaging wheels, said rake assembly being adapted to smooth sand over which said rake assembly is dragged, said rake assembly being adapted to selectively be lowered and raised to engage or disengage said sand, said rake assembly including an elongated drawbar oriented generally transverse to travel direction of said riding bunker rake, said drawbar having a center, a hitch connected to said frame and attached to said drawbar near said drawbar center, at least one flexible tensionable linkage having an end attached to said drawbar, and another end which attaches to a mechanism for selectively raising and lowering said rake assembly, and a plurality of trowel blades and finishing blades attached to said drawbar, said trowel blades having a front portion with a plurality of tines extending vertically downward along said front portion and having a rear portion that is a thin plate angled downward and rearward form said tines, said finishing blades having a thin plate angled downward and rearward, said finishing blades being disposed behind said trowel blades and staggered laterally with said trowel blades to smooth sand flowing between said trowel blades; and (k) a mechanism for selectively raising and lowering said rake assembly, said mechanism including a rotatable bar having at least one rake lifting arm and at least one actuator attach arm extending approximately normal from said bar, an electrically powered actuator connected between said at least one actuator arm and said frame, said at least one rake lifting arm being connected to a flexible tensionable linkage attached to said rake assembly, said actuator being movable to push or pull on said at least one actuator arm, thereby rotating said bar which lowers or raises said rake assembly through said at least one rake lifting arm and said flexible tensionable linkage.

30. A riding bunker rake, comprising:

(a) a frame;

(b) a plurality of ground engaging wheels supporting said frame;

(c) a battery power source;

(d) a prime mover adapted to use electrical energy from said battery power source to provide driving torque to at least one of said ground engaging wheels, said driving torque being provided to said at least one wheel through a drive shaft connected between said prime mover and said at least one wheel, said prime mover including an electric motor and a reducer which ratios revolutions of said electric motor to revolutions of said drive shaft;

(e) a rake assembly attached to said frame and disposed behind said ground engaging wheels, said rake assembly being adapted to smooth sand over which said rake assembly is dragged, said rake assembly being adapted to selectively be lowered and raised to engage or disengage said sand;

(f) means for selectively raising and lowering said rake assembly; and (g) an electronic regenerative braking system which detects speed of said riding bunker rake and reverses field polarity on said electric motor when a threshold speed of said riding bunker rake is exceeded, thereby operating said electric motor as a generator which reduces speed of said riding bunker rake and puts some electrical energy back into said battery power source, said threshold speed being 2 miles per hour when said riding bunker rake is not being driven.

31. A riding bunker rake, comprising:

(a) a frame;

(b) a plurality of ground engaging wheels supporting said frame;

(c) a battery power source;

(d) a prime mover adapted to use electrical energy from said battery power source to provide driving torque to at least one of said ground engaging wheels, said driving torque being provided to said at least one wheel through a drive shaft connected between said prime mover and said at least one wheel, said prime mover including an electric motor and a reducer which ratios revolutions of said electric motor to revolutions of said drive shaft;

(e) a rake assembly attached to said frame and disposed behind said ground engaging wheels, said rake assembly being adapted to smooth sand over which said rake assembly is dragged, said rake assembly being adapted to selectively be lowered and raised to engage or disengage said sand;

(f) means for selectively raising and lowering said rake assembly; and (g) an electronic regenerative braking system which detects speed of said riding bunker rake and reverses field polarity on said electric motor when a threshold speed of said riding bunker rake is exceeded, thereby operating said electric motor as a generator which reduces speed of said riding bunker rake and puts some electrical energy back into said battery power source, said threshold speed being dual including a first threshold speed and a second threshold speed, said regenerative braking system reversing field polarity on said electric motor when said riding bunker rake is being driven and exceeds said first threshold speed, said regenerative braking system reversing field polarity on said electric motor when said riding bunker rake is not being driven and exceeds said second threshold speed.

32. A riding bunker rake, comprising:

(a) a frame;

(b) a plurality of ground engaging wheels supporting said frame;

(c) a battery power source;

(d) a prime mover adapted to use electrical energy from said battery power source to provide driving torque to at least one of said ground engaging wheels;

(e) a rake assembly attached to said frame and disposed behind said ground engaging wheels, said rake assembly being adapted to smooth sand over which said rake assembly is dragged, said rake assembly being adapted to selectively be lowered and raised to engage or disengage said sand;

(f) means for selectively raising and lowering said rake assembly; and (g) a foot-pedal activated braking system including a brake pedal pivotably attached to said frame, said brake pedal having a first end and a second end, a foot pad attached to said first end, a linkage attached to said second end, at least one cable attached to said linkage and to brakes on at least one wheel.

* * * * *